(12) United States Patent
Watson

(10) Patent No.: US 6,845,667 B1
(45) Date of Patent: Jan. 25, 2005

(54) HIGH Q ANGULAR RATE SENSING GYROSCOPE

(75) Inventor: William S. Watson, Eau Claire, WI (US)

(73) Assignee: Watson Industries, Inc., EauClaire, WI (US)

( * ) Notice: Subject to any disclaimer, the term of this patent is extended or adjusted under 35 U.S.C. 154(b) by 310 days.

(21) Appl. No.: 10/048,601

(22) PCT Filed: Sep. 14, 2000

(86) PCT No.: PCT/US00/25318

§ 371 (c)(1),
(2), (4) Date: Feb. 1, 2002

(87) PCT Pub. No.: WO01/20257

PCT Pub. Date: Mar. 22, 2001

Related U.S. Application Data

(63) Continuation-in-part of application No. 09/880,433, filed on Jun. 13, 2001, which is a continuation-in-part of application No. 09/397,718, filed on Sep. 16, 1999, now Pat. No. 6,272,925.

(51) Int. Cl.$^7$ .................................................. G01P 9/02
(52) U.S. Cl. .............................. 73/504.12; 73/504.08; 73/504.18
(58) Field of Search .................. 73/504.12, 504.02, 73/504.13, 504.14, 504.18

(56) References Cited

U.S. PATENT DOCUMENTS

| | | | |
|---|---|---|---|
| 4,302,694 A | | 11/1981 | Fujishima et al. |
| 4,912,990 A | * | 4/1990 | Norling .................... 73/862.59 |
| 4,951,508 A | | 8/1990 | Loper, Jr. et al. |
| 5,014,554 A | | 5/1991 | Terada et al. |
| 5,074,152 A | | 12/1991 | Ellner et al. |
| 5,218,867 A | | 6/1993 | Varnham et al. |
| 5,226,324 A | | 7/1993 | Oikawa et al. |
| 5,313,835 A | * | 5/1994 | Dunn ....................... 73/514.15 |
| 5,339,698 A | * | 8/1994 | Robinson et al. ......... 73/862.59 |
| 5,493,166 A | | 2/1996 | Kasanami et al. |
| 5,627,314 A | * | 5/1997 | Hulsing, II .............. 73/504.04 |
| 6,272,925 B1 | | 8/2001 | Watson |
| 6,550,329 B1 | * | 4/2003 | Watson .................... 73/504.13 |
| 6,561,029 B2 | * | 5/2003 | Folkmer et al. ......... 73/504.14 |
| 6,564,637 B1 | * | 5/2003 | Schalk et al. ............ 73/504.12 |

FOREIGN PATENT DOCUMENTS

| | | |
|---|---|---|
| JP | 2-266215 A | 10/1990 |
| JP | 3-13006 A | 1/1991 |

OTHER PUBLICATIONS

I. Hopkin, Performance and Design of a Silicon Micromachined Gyro, British Aerospace Systems and Equipment, 10 pgs, Plymouth, UK.

Gyroscope, http://www.tecmobility.it/English/giroscopio_ing.shtml, 2 pgs.

Intertial proprioceptive devices: Self–motion–sensing toys and tools, http://www–i.almaden.ibm.com/journal/sj/mit/sectione/verplaetse.html. 2 pgs including exploded view of Fig. 5.

* cited by examiner

Primary Examiner—Hezron Williams
Assistant Examiner—Jacques M. Saint-Surin
(74) Attorney, Agent, or Firm—Moore, Hansen & Sumner, PLLP

(57) ABSTRACT

A structure and arrangement for improving the accuracy and efficiency of an angular rate sensing gyroscope is herein disclosed. Voltage pick-off conductors are applied to an area of the surface of a resonating element of an angular rate sensing gyroscope that is subject to substantially zero stress when the gyroscope is rotationally stationary. Actuator conductors are similarly applied to a resonating element at a location bounded by areas of the resonating element subject to substantially uniform levels of stress when the gyroscope is rotationally stationary. A method for improving the voltage response of a piezoelectric resonating element is also disclosed.

35 Claims, 9 Drawing Sheets

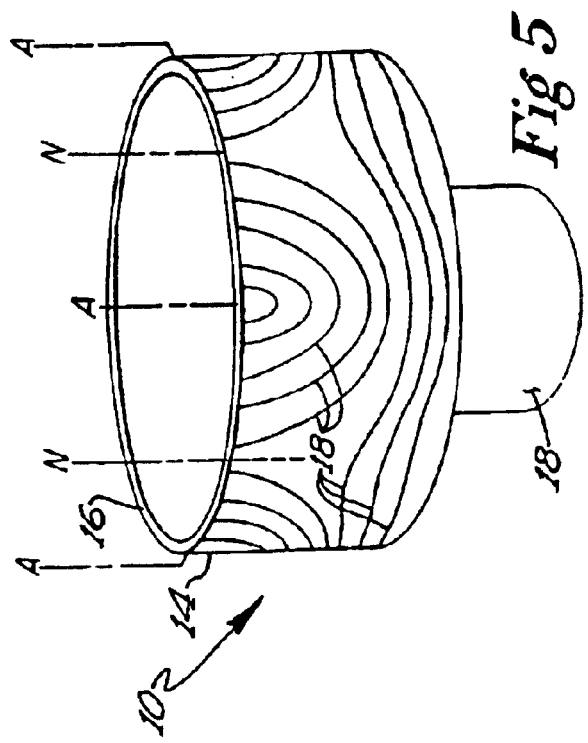
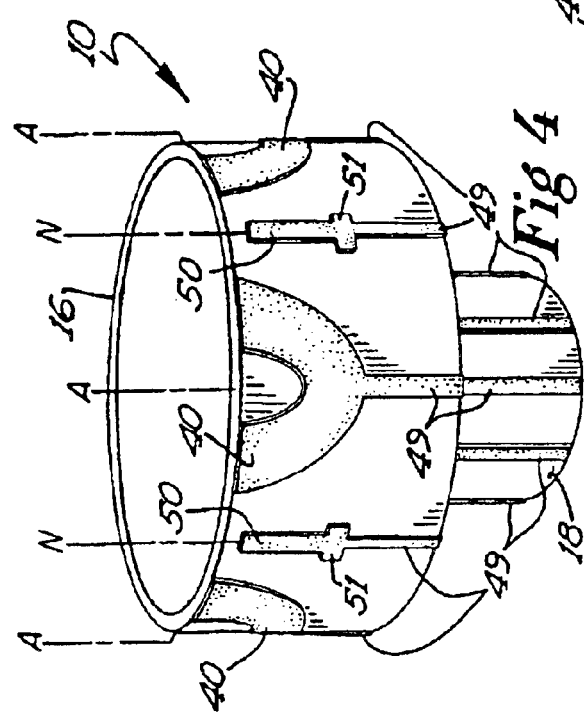
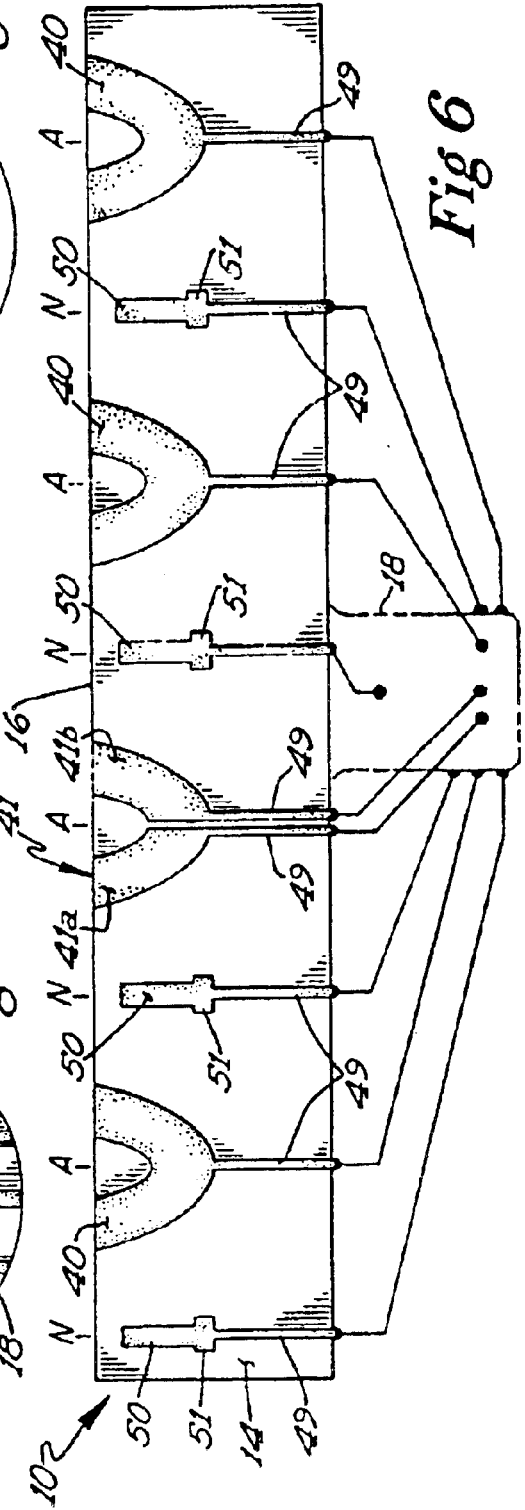
Fig 4
Fig 5
Fig 6

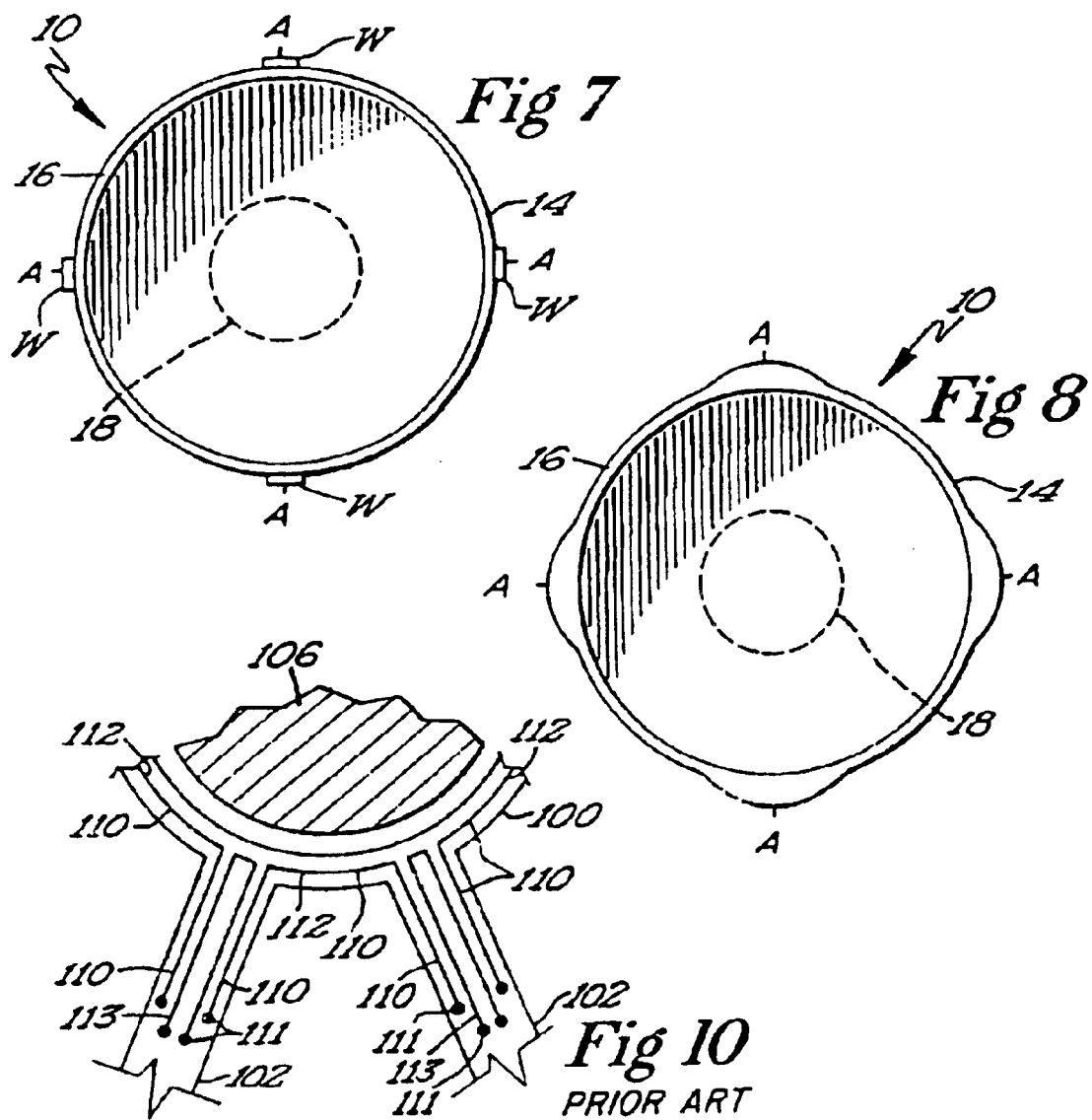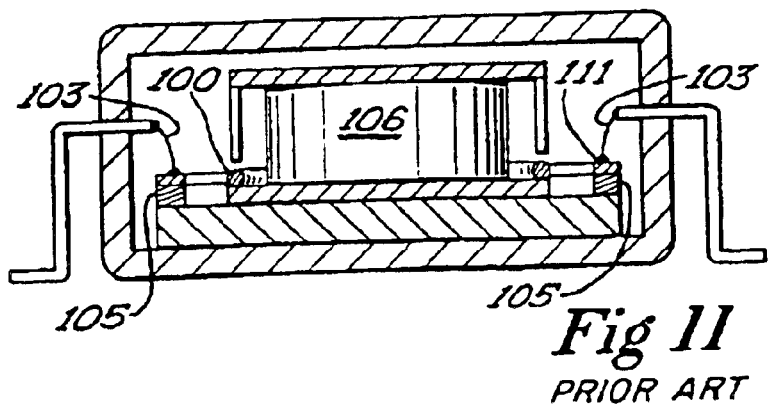

HIGH Q ANGULAR RATE SENSING GYROSCOPE

RELATED APPLICATIONS

This application claims priority from Patent Cooperation Treaty application no. PCT/US00/25318, filed on Sep. 14, 2000, which is itself a Continuation-in-Part of U.S. patent application Ser. No. 09/397,718 filed Sep. 16, 1999. In addition, U.S. patent application Ser. No. 09/880,433 filed on 13 Jun. 2001 is a divisional application of U.S. patent application Ser. No. 09/397,718.

FIELD OF THE INVENTION

The present invention is drawn to an angular rate sensor of the type utilizing an oscillating resonating element. More specifically, the present invention is drawn to the shape and placement of actuators and pick-offs upon resonating elements of angular rate gyroscopes.

BACKGROUND OF THE INVENTION

Rate gyroscopes operate on the principle of inertia. Standing waves are excited in a resonating element to produce a desired mode of oscillation having a predetermined number of nodes. The oscillations have an amplitude, a frequency, and an inherent oscillatory inertia that is independent of the linear and rotational inertia of the gyroscope itself. When the resonating element is rotated about its sensing axis, the oscillations will in large part maintain their absolute spatial orientation. However, in maintaining their absolute spatial orientation, the nodes that define the desired mode of oscillation will rotate with respect to the physical structure of the resonating element. This rotation of the nodes is proportional to the physical rotation applied to the resonating element. Taking advantage of this phenomenon, it is possible to measure the rate of rotation and determine the magnitude and direction of the rotation that the resonating element has been subjected to about its sensitive axis.

Solid-state gyroscopes based on the principle described above are capable of sensing rotation only, and then only about a single axis. To obtain information sufficient to determine the relative attitude of a body, it is necessary to group at least three such gyroscopes in an orthogonal relationship covering the x, y, and z Cartesian axes.

DESCRIPTION OF THE PRIOR ART

One well-known type of angular rate sensor comprises piezoelectric ceramic crystals in a paired tuning fork arrangement. Examples of this type of angular rate sensor are shown in U.S. Pat. No. 4,628,7734 to Watson and U.S. Pat. No. 4,671,112 to Kimura. In this type of sensor a pair of drive elements are energized to induce a controlled vibration therein. The drive elements are arranged such that the oscillations induced are in a single plane. Sensing elements are coupled to the ends of the drive elements and oscillate along with the drive elements in the single plane. However, the sensing elements are arranged so that flexure of the sensing elements will take place only in a plane perpendicular to the plane of vibration of the driving elements. The application of a rotational force to the vibrating sensor elements in the perpendicular plane induces a sensed output signal that may be monitored and filtered to characterize the angular rate of change of the sensing object to which the sensing elements are mounted. Though the tuning fork type of angular rate sensor attempts to isolate the sensing elements from the drive elements by rotating the sensing elements 90° from the drive elements, small bending forces due to the oscillation of the drive elements are imposed upon the sensing elements. These undesirable bending forces create voltage signals that may degrade the signal to noise ratio of the voltage output of the sensing elements and may indicate falsely that the angular rate sensor is being rotated about its sensitive axis.

Another type of angular rate sensor utilizes a cup or bell shaped resonator that is forced to oscillate in known manner. One such sensor is shown in U.S. Pat. No. 5,218,867 to Varnham, et al. See FIGS. 1–3. The cup portion of the Varnham resonator is supported upon a stem that is in turn secured to the chassis of the sensor. Varnham utilizes a pair of actuators arranged at an angle of 45° to one another to induce a desired mode of oscillation in the resonator. The resonator itself is fabricated from a piezoelectric ceramic material and the actuators are thin or thick film conductive materials that are applied directly to the wall of the resonator in a known manner. In order to sense a rate of rotation, the Varnham device provides a pair of pick-offs, identical in construction to the actuators and applied to the resonator in diametric opposition to the pair of actuators. An actuator drive network acts through the actuators to impose a phase locked voltage waveform upon the resonator, thereby causing the resonator to assume a desired mode of oscillation. The pick-offs sense variations in the desired mode of oscillation caused by angular rotation of the sensor. The signals from the pick-offs are demodulated using the imposed driving voltage waveform. The resulting signal is proportional to the angular rate of rotation of the sensor and by integrating the resulting signal over time, one can determine the actual angle through which the sensor has rotated. The angle of rotation is, in turn, used by the actuator drive network to modify the waveform being imposed upon the resonator to bring the resonator back to the desired mode of oscillation.

Problems with angular rate sensors of the type patented by Varnham include a relatively low Q value, low sensitivity, and low accuracy. For instance, the actuators and pick-offs of prior art devices such as the Varnham device, are uniformly large patches of conductive material applied to the resonator in a manner such that the actuators and pick-offs span a wide range of stresses in the resonator walls. Because piezoelectric voltages are generally proportional to the stress in a piezoelectric material, a voltage applied across a region subject to a range of stresses causes the areas of differing stress within the piezoelectric material to work against one another, thereby reducing the Q value of the resonator. Likewise, a voltage measured across a wide range of stresses is more likely to be an average of the voltages produced in the resonator at each of the stress gradients that a pick-off crosses.

In addition, the application of actuators and pick-offs across a range of stresses, in combination with non-uniform voltage responses in the piezoelectric materials, make it more difficult to force the resonator to oscillate in its desired mode. In order to ensure the proper oscillation, much more energy is expended in the correction of the vibrations, thereby lowering the Q value of the resonator. The Q value of a vibrating system is the ratio of the magnitude of the total energy of a vibrating system to the magnitude of the energy added to the system during each oscillatory cycle.

The large size of the conductive patches of the pick-offs contributes to the low accuracy of rate gyroscopes of the type patented by Varnham. FIG. 3 illustrates prior art pick-off and actuator conductors C having large surface areas of the type described by Varnham. Piezoelectric materials are not uniform in their voltage response and therefore it is frequently the case that a pick-off having a large surface area will sense net voltages skewed by an uneven voltage response of the piezoelectric material. The larger the area of coverage of the pick-off, the more likely it is that the voltages sensed by the pick-offs will comprise a significant signal due to uneven voltage response of the piezoelectric material of the resonator. And because the actual voltages sensed by the pick-offs are quite small, voltage signal components due to uneven voltage responses frequently alter the signal to noise ratio of the sensed voltages to an extent that makes it difficult to determine accurately the rate and magnitude of rotation of the gyroscope. Furthermore, because it is also frequently the case that the voltage response of respective areas of the piezoelectric materials that make up a resonator may vary independently with changes in the ambient temperature of the operating environment of the gyroscope, the noise to signal ratio of the sensed voltages may become further degraded.

A further problem can arise because, in general, piezoelectric materials are made up of many individual crystals that have been sintered together and given a particular polarity by the application of a strong DC voltage. Where this polarization is performed over a discrete area of the piezoelectric material, such as over the surface of the resonator covered by the conductive patches of the actuators and pick-offs, the polarization of the material at the edges of the discrete area will not be in the desired direction and will therefore generate irregular voltage responses. In addition, it is not uncommon that the piezoelectric material of the resonator will be subject to irregular stresses or flexure. The combination of irregular stresses or flexure with uneven edge polarization may cause severe fluctuations in the accuracy and sensitivity of the angular rate sensor and may also lower the Q value of the system.

In addition to the problems mentioned above, it is known to make electrical connections between actuators and pick-offs on a resonator and the associated sensing and filtering electronics, using fine wires 23 as connectors. See FIG. 1. These wires 23 are connected at each end but otherwise unsupported therebetween. The wire used in making these connections must be extremely fine so as to avoid interfering with the vibrations set up in the resonator. The small size of the connection wires 23 makes them weak and prone to frequent failure due to applied forces and internal stresses resulting from the ultrasonic wedge bonding processes that are typically used to make such small electrical connections. In addition, the use of solder or solder-like materials on the resonator at the physical contact between the wire 23 and the resonator tend to interfere with the inducement and maintenance of the desired mode of oscillation, thereby lowering the Q factor of the system.

OBJECTIVES OF THE INVENTION

Therefore, it is an objective of the present invention to provide a uniformly polarized piezoelectric resonator. It is another object of the present invention to improve the accuracy and Q value of the resonator by providing a plurality of actuators that are contoured to conform to areas of substantially uniform stress in the walls of the resonator and which are located on the resonator so as to maximize the flexure of the resonator wall per unit volt applied to the resonator. Similarly, it is yet another object of the invention to suppress unwanted modes of oscillation through the proper arrangement of actuators and pick-offs on the piezoelectric resonator. Another objective of the present invention is to provide a pick-off structure that minimizes error due to undesirable stresses and deformations present in a resonating element. Another objective is to reduce the inherent variations in output voltage sensed at the nodal pick-offs due to fluctuations in the environmental conditions in which the gyroscope is operating. Yet another objective is to provide more reliable electrical connections between the actuators and pick-offs and the electronics used to filter and process the electrical signals received from and sent to the actuators and pick-offs, respectively.

SUMMARY OF THE INVENTION

With the aforesaid background in mind, improved pick-off and actuator conductors have been developed which minimize error in the angular rate of change reported by an angular rate sensing gyroscope. Furthermore, angular rate sensing gyroscopes incorporating the present invention have a more uniform voltage response and are provided with conductive leads that are relatively resistant to damage.

An angular rate sensing gyroscope constructed according to the present invention comprises a resonating element that is arranged and constructed to output voltage signals proportional to a level of stress induced therein, means for imposing a predetermined mode of oscillation upon the resonating element, a voltage pick-off conductor on the surface of the resonating element that is arranged and constructed to sense stress-induced voltage signals outputted by the resonating element, and means for processing the voltage signals sensed by the pick-off conductor. The pick-off is applied to an area of the surface of the resonating element where the stress in the shell wall is minimal and preferably substantially zero when the gyroscope is rotationally stationary. Consequently, any voltage signals sensed by the pick-off conductor are indicative of the rate at which the gyroscope is rotating.

A resonating element according to the present invention is characterized by the ability to vibrate in a predetermined mode of oscillation defined by a plurality of stable nodes and anti-nodes. Actuator conductors of the present invention are applied to the surface of said resonating element substantially at the anti-nodes and pick-off conductors are applied substantially at the nodes. The advantageous arrangement of the actuator and pick-off conductors on the anti-nodes and nodes, respectively, results in a more sensitive and efficient angular rate sensing gyroscope.

The actuator conductors of the present invention are applied to the resonating element at predetermined locations upon the surface of the resonating element that are defined by boundaries that are congruent with areas of the resonating element that are subject to substantially uniform levels of stress when the gyroscope is rotationally stationary. Alternatively, the areas to which the actuator conductors are applied are demarcated by at least one stress gradient line that defines an area of substantially uniform stress present in the resonating element when the gyroscope is rotationally stationary. Essentially, the edges of the actuator conductors are congruent with the stress gradient contour lines that identify areas of substantially uniform stress in the resonating element. Often it is helpful for at least one of the actuator conductors to comprise two vertically symmetrical halves. These symmetrical halves are electrically isolated from one another and are independently electrically connected to a drive circuit that is constructed and arranged to apply a predetermined sequence of voltage signals to the resonating element through the actuators so as to impose a predetermined mode of oscillation upon said resonating element.

Because the size of a gyroscope constructed according to the present invention may vary greatly in size with each particular application, it is preferred to specify the general dimension of the actuators, pick-offs and leads in terms of a percentage of the diameter of the resonating element. In one embodiment the vertical and horizontal dimensions of the actuators are approximately 20% and 40% of the diameter of the resonating element, respectively. In this embodiment, a resonating element having a diameter of approximately 0.750 inches has an actuator conductor that is approximately 0.150 inches high and spans approximately 0.30 inches. This actuator conductor is disposed upon the surface of the shell wall symmetrically about the anti-node. The upper and lower boundaries of this actuator conductor are substantially congruent to stress gradient contour lines that delineate a line of substantially uniform stress in the shell wall.

Placement of the pick-off conductors at the nodes of the resonating element ensures that the pick-off conductors will sense a net voltage signal of substantially zero when the gyroscope is rotationally stationary. But where due to geometric or voltage response discontinuities the net voltage signal sensed by the pick-off conductor when the gyroscope is rotationally stationary is not substantially zero, a balancing conductor may be applied to the surface of the resonating element in conductive communication with the pick-off conductor. Balancing conductors are arranged and constructed to zero any net voltage signals sensed by the voltage pick-off conductor when the resonating element of the gyroscope is rotationally stationary. One embodiment of the present invention includes a pick-off having a width that is between 4% and 8% of the diameter of the resonating element.

The resonating element may be any of a number of suitable shapes. Specific examples of resonating elements include, but are not limited to, cylinder-, ring-, and bar-shaped structures. The bar-shaped structures that may be used as a resonating element have a polygonal cross section. One particular example of a suitable bar-shaped resonating element is a triangular prism having three longitudinal sides with each longitudinal side having applied thereto a conductive element. In this example, two of the three conductive elements are used as pick-off conductors and the third is the actuator conductor. Another example of a suitable resonating element is a curvilinear axi-symmetric shell fashioned from a piezoelectric material.

The present invention may also be adapted for use with an angular rate sensing gyroscope of a type comprising a ring suspended from a support structure in a magnetic field by a plurality of leg members. This ring shaped resonating element is capable of vibrating at a resonant frequency that is defined by a plurality of vibratory nodes and anti-nodes as is more completely described below. The ring is further provided with a plurality of pick-off conductors that are arranged to sense electrical currents indicative of the rate of rotation of the gyroscope. These rotation-indicating currents are induced in the pick-off conductors by movement of the ring and conductors through the magnetic field when the ring is deflected by rotation of the gyroscope. A plurality of actuator conductors is also arranged on the ring so as to pass currents through the magnetic field, thereby inducing resonant vibrations in the ring. In such a rate sensing gyroscope, the present invention embodies an improvement that comprises supporting the ring from a plurality of pairs of leg members. The leg members are located adjacent to and symmetrically bracket the nodes of the ring. Pick-off conductors are arranged upon the leg members so as to form a loop, each pick-off conductor being applied down one of the leg members of a pair of leg members, across the portion of the ring intermediate the pair of leg members, and up the remaining leg member of the pair of leg members. This arrangement advantageously centers the portions of the pick-off conductors on the ring symmetrically about the respective nodes of the ring. Likewise, a plurality of actuator conductors are arranged in a loop, being disposed down a leg member of a first pair of leg members, along the ring intermediate the first pair of leg members and a second pair of leg members, and up a leg member of the second pair of leg members nearest the first pair of leg members. This arrangement also permits the actuator conductors to be centered symmetrically about the respective anti-nodes of the ring. The respective conductor loops formed by the pick-off and actuator conductors are, in turn, electrically connected to circuit means for operating the gyroscope.

In this embodiment of the present invention, each node and anti-node of the ring may be provided with a pick-off conductor or actuator conductor, respectively. However, there is no requirement that each of the nodes and anti-nodes have a conductor associated therewith. Furthermore, it may be desirable to extend the pick-off conductors and actuator conductors around substantially the entire circumference of said ring, though again there is no such absolute requirement.

In a tuning fork type angular rate sensing gyroscope composed of vibrator components which include a pair of parallel piezoelectric drive elements and a pair of parallel piezoelectric sensing elements joined together in respectively orthogonal planes, a plurality of leads electrically connected to the drive and detection elements, and a plurality of lead terminals electrically connected to the leads, a voltage pick-off conductor according to the present invention is disposed on the surfaces of each of the sensing elements. These pick-off conductors are arranged and constructed to sense stress-induced voltage signals outputted by the resonating element that is indicative of a rate of rotation of the angular rate sensing gyroscope. The pick-off conductors are applied to areas of the surface of the sensing elements that are subject to substantially zero or minimal stress when the angular rate sensor is rotationally stationary. The voltage pick-off conductors provide electrical pathways from the sensing elements to the leads.

In another embodiment of the present invention, a resonating element having a polygonal cross-section has a predetermined number of improved conductive elements applied to the sides or faces thereof. The conductive elements are applied to the resonating element at areas of the sides or faces that are subject to drive motion stress which, when differentially sensed, is substantially zero or minimal when angular rate sensing gyroscope is rotationally stationary. The conductive elements of this embodiment may further be provided with a voltage balancing conductor applied to the resonating element in electrical communication with the conductive elements so as to zero or minimize net voltage signals sensed by said conductive elements when the angular rate sensing gyroscope is rotationally stationary. It is important to note that differential sensing using conductive elements that are applied to substantially the entire length of the resonating element tends to damp out uniformly applied disturbances to the resonating element such as vibrations and magnetic fields.

Another manner of ensuring that a resonating element will oscillate in a desired mode is to physically damp out unwanted modes of oscillation. This may be accomplished by altering the geometry or structure of the resonating element at predetermined locations upon the element. This manner of physical damping of oscillations is particularly, but not exclusively, applicable to axi-symmetric type resonating elements such as the ring- and the cylinder-shaped elements. With regard to the ring- and cylinder-shaped resonating elements, the specific means of physically damping out unwanted modes of oscillation may comprise thickening the walls or cross sections of these resonating elements at the anti-nodes thereof.

Rate sensing gyroscopes are more accurate when the piezoelectric material of the resonating element has a uniform voltage response. A method of improving the uniform voltage response of a piezoelectric resonating element at a predetermined location of a solid resonating element having first and second opposing surfaces begins with the step of applying a thick or thin film conductor to the entire first surface of the resonating element. Next, an applied film conductor is applied to the entire second surface of the resonating element. The respective applied film conductors are then connected to a DC voltage source that applies a DC voltage of predetermined strength across the respective applied film conductors so as to uniformly modify the voltage response of the piezoelectric material of the resonating element over substantially the entire area of the piezoelectric material located between the respective applied film conductors. Finally, predetermined portions of the respective applied film conductors are removed to create a plurality of discrete applied film conductors arranged upon one or both of the surfaces of the resonating element as described above.

The useful life of a rate gyroscope comprising an axi-symmetrical resonating element is greatly improved by providing a plurality of applied film conductor leads which extend from each of the actuator conductors and pick-off conductors arranged upon the surface of the resonating element, to the base portion of the resonating element. The applied film conductor leads electrically connect the actuator conductors and pick-off conductors to circuitry for operating the angular rate sensing gyroscope. The use of applied film conductor leads in the place of fine wires reduces the amount of failures due to stress fracture of the wires. A suitable applied film conductor lead has a width between 1% and 4% of the diameter of the resonating element to which it is applied. Preferably, the electrical connections between the applied film conductor leads and the drive circuitry of the gyroscope are made at the base of the resonating element where there is substantially no vibration in the resonating element.

These and other objects and advantages of the invention will become readily apparent as the following description is read in conjunction with the accompanying drawings wherein like reference numerals have been utilized to designate like elements throughout the several views wherever possible.

DESCRIPTION OF THE DRAWINGS

FIG. 4 is a perspective view of an axi-symmetric shell similar to that illustrated in FIG. 1 having actuators and pick-offs constructed and arranged according to the present invention applied thereto;

FIG. 5 is a schematic representation of the arrangement of stress gradients within the walls of the resonator illustrated in FIG. 4;

FIG. 5a is a schematic representation of the arrangement of stress gradients within the walls of the resonator illustrated in FIG. 4a;

FIG. 6 is projection of the walls of the axi-symmetric shell illustrated in FIG. 4;

FIG. 6a is projection of the walls of the axi-symmetric shell illustrated in FIG. 4a;

FIG. 7 is a top plan view of an axi-symmetric shell having weights applied to the walls at the anti-nodes of the shell;

FIG. 8 is a top plan view of an axi-symmetric shell having thickened walls at the anti-nodes of the shell;

FIG. 10 is a detailed schematic view of a pair of legs of the prior art oscillating ring rate gyroscope of FIG. 9;

FIG. 11 is a sectional side view of the prior art oscillating ring rate gyroscope of FIG. 9;

DETAILED DESCRIPTION OF THE INVENTION

Figure 1:
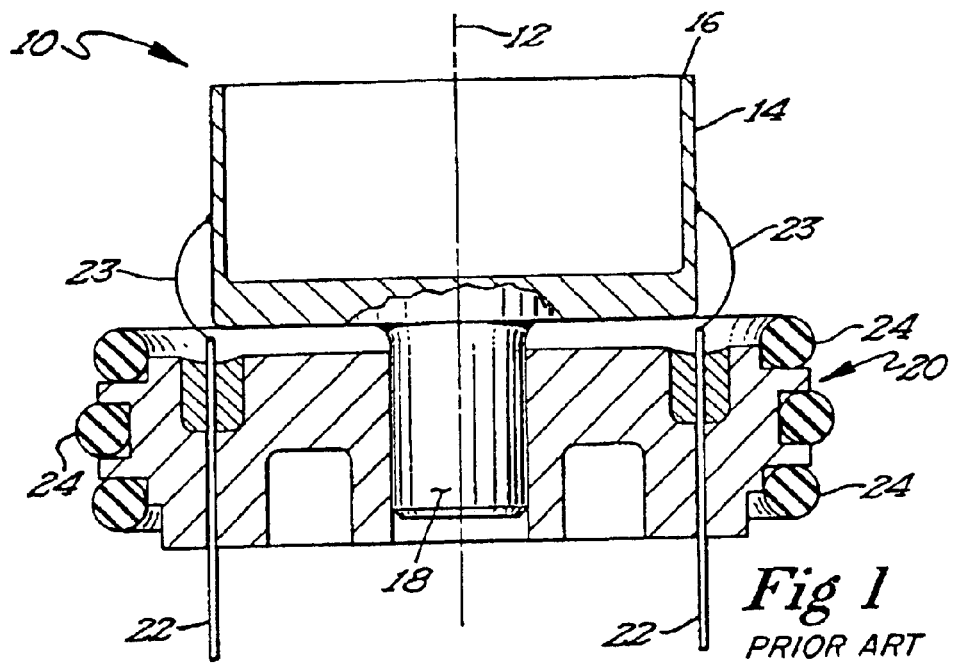
FIG. 1 is a cross-sectional view of an axi-symmetric shell of the prior art used as a resonating element in a rate integrating gyroscope shown in relation to a chassis for supporting the shell.
Figure 2:
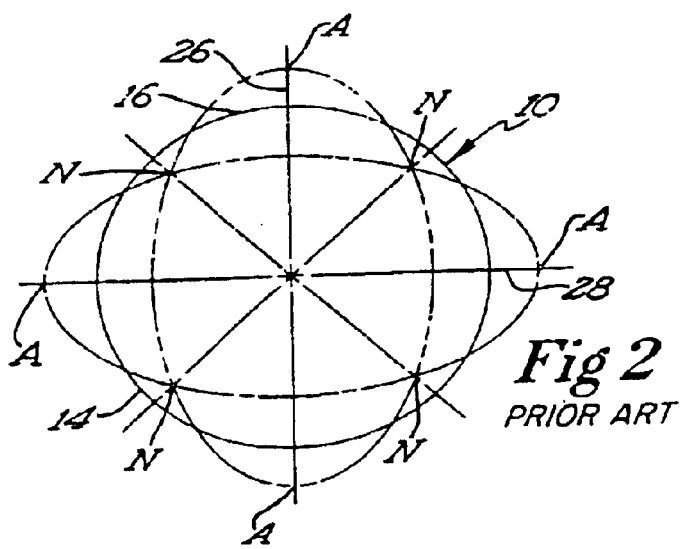
FIG. 2 is a schematic illustration of the preferred mode of oscillation of the upper edge of the axi-symmetric shell of FIG. 1.

The preferred embodiment of the present invention may be used in conjunction with various types of resonating elements used in rate gyroscopes. However, the preferred embodiment of the present invention will be most fully described as applied to an axi-symmetric shell 10 such as the shell illustrated in FIGS. 1, 3–5a. Such a shell 10 may be caused to vibrate at a resonant frequency having a preferred mode of oscillation that is characterized by two nodal diameters (n=2) as illustrated in FIG. 2. It is to be understood that the improvements disclosed herein may have application outside of the specific embodiments described herein and are therefore not to be limited to just these embodiments.

Referring first to FIGS. 1, 3–5a, the shell 10 of the preferred embodiment is generally cylindrical and has an axis of symmetry indicated at 12. The upper portion of the shell 10 is a hollow cylinder having a relatively thin wall 14 with an upper edge 16. The lower portion or stem 15 of the shell supports the upper portion of the shell 10 and is arranged to be received within a base 20. The base 20 is in turn arranged to secure the shell 10 to a sensor chassis (not shown) and provides electrical leads 22 which are connected by thin wires 23 to a plurality of conductors C that are applied to the surface of the shell 10 to the electrical components of the sensor. O-rings 24 on base 20 aid in isolating the shell 10 from external inputs such as vibrations that exist in the sensor chassis.

The shell 10 is fashioned of a piezoelectric material so that deformation or flexure of the shell 10 will produce a charge or voltage signal and a voltage signal imposed on the shell 10 will produce a deformation or flexure in the shell 10.

The preferred mode of oscillation for the axi-symmetric shell 10 is illustrated in FIG. 2. The upper edge 16 of the shell 10 oscillates at its lowest resonant frequency between a first nodal diameter indicated at 26 and a second nodal diameter indicated at 28. As can be seen in FIG. 2, at each nodal diameter 26, 28 the upper edge 16 of the shell assumes the shape of an ellipse. In this preferred mode of oscillation, the upper edge 16 of the shell 10 has four nodes N and four anti-nodes A. The anti-nodes A are located at the points of maximum deflection in the upper edge 16 of the shell 10, i.e. at the ends of the two nodal diameters 26, 28, and the nodes N are at the points of zero deflection. The nodes N and anti-nodes A are spaced at 45° from one another, respectively.

Figure 5A:
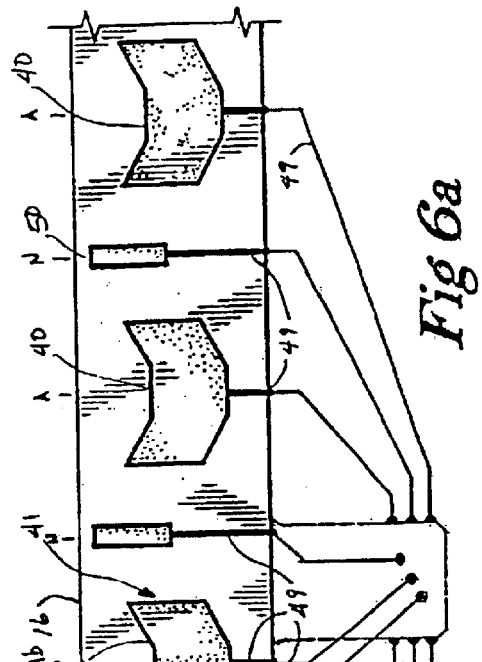

When the shell 10 oscillates at its resonant frequency as illustrated in FIG. 2, the piezoelectric material of the wall 14 directly at the nodes N is not flexed to any significant degree and subsequently, the charge signals sensed at the nodes N are minimal or preferably substantially zero. Conversely, the piezoelectric material of the wall 14 at the anti-nodes A is flexed during oscillation at the resonant frequency and hence, a relative large charge signal may be produced. Understandably, stresses are produced in the wall 14 of the shell 10 during oscillation. These stresses are relative to the magnitude or amplitude of the deformations in the piezoelectric material of the wall 14 of the shell 10. FIGS. 5 and 5a schematically illustrate how these stresses are arranged in an axi-symmetric shell 10 oscillating as illustrated in FIG. 2. Note that the actual stress patterns set up in the wall 14 of the shell 10 may differ from the schematic illustration of FIGS. 5 and 5a depending on the structure, material and most of oscillation of the shell 10.

In FIGS. 5 and 5a, lines 18 are contour lines that identify stress gradients set up in the wall 14 of the shell 10 by the deformations of the shell 10 during oscillation. By definition, the deformations and subsequent stresses in the wall 14 at nodes N are substantially zero or, at the very least, are minimal with respect to the much greater deformations and stresses present at the antinodes A. The wall 14 at anti-nodes A is subjected to large deformations and hence, a great deal of stress, with the level of stress becoming greater approaching the upper edge 16 of the shell 10. The wall 14 of the shell 10 is essentially fixed at its base and free to be deflected near the upper edge 16 thereof. Near the base of the wall 14, the deformation of the wall 14 is exceedingly small, however, due to the interplay of both bending and stretching forces in the shell wall 14, the amount of stress at the base of the shell wall 14 may be higher than would be expected of this location if it were subjected to bending stresses alone.

As can be seen in FIG. 5, for this mode of oscillation, i.e. n=2, the stresses in the piezoelectric material of the wall 14 of the shell 10 are minimal at the nodes N and maximized at the anti-nodes A. Though the preferred mode of oscillation is at n=2, it is to be understood that the shell may be made to oscillate in modes defined by more than two nodal diameters, e.g. even numbers such as n=2, 4, 6, 8 . . . It is also to be understood that where the shell 10 is forced to oscillate in a mode having more than two nodal diameters (i.e. n>2), the pattern of the stresses set up in the wall 14 of the shell 10 will vary from those illustrated in FIG. 5. However, the principles of the present invention will yet apply. That is to say, the features of the preferred embodiment of the present invention may be successfully applied with minimal alterations to a resonator oscillating in a stable mode having more than two nodal diameters.

FIG. 5a is another representation of the peak stresses present in the shell wall 14 where the shell 10 is oscillating in a stable mode having two nodal diameters (n=2). The illustration of the peak stresses in FIG. 5a is derived from a finite element mathematical model and is believed to be more representative of the maximum stresses that will be present in the wall 14 of one embodiment of an axi-symmetric shell 10 during oscillation of the shell 10. As can be appreciated, the stresses in the shell wall 14 are greatest near the upper edge 16 of the shell 10.

Figure 3:
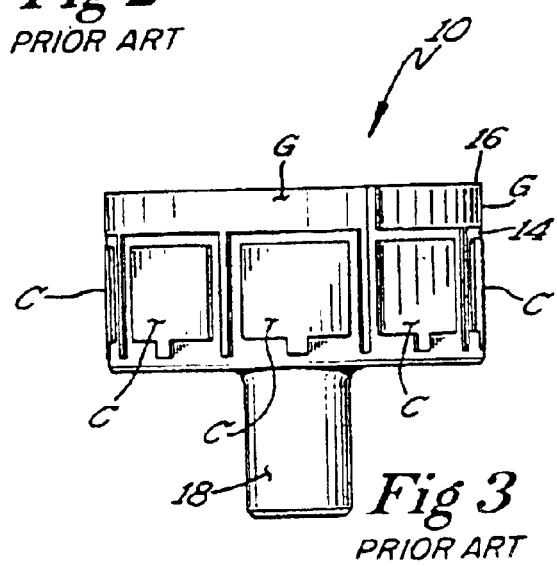
FIG. 3 is an elevation of the prior art axi-symmetric shell of FIG. 1 illustrating the placement of conductors C thereon.

FIG. 3 illustrates an axi-symmetric shell 10 having prior art conductors C applied directly to the wall of the shell 10 over relatively large areas of the wall 16. These relatively large conductors C are identical and intersect many distinct stress gradient contour lines 18 that are set up in the piezoelectric material of the wall 14 of the shell 10 by the oscillations of the shell 10. In this prior art conductor design, the conductors C are used for applying and receiving voltage signals to and from the piezoelectric material from which the shell 10 is fabricated. Typically, all or a portion of the interior of a shell 10 is coated with a grounded conductor G so as to create the requisite voltage differential across the wall 14 of the shell 10 when electrical signals are applied to the wall 14 of shell 10 by conductors C. The conductor G has fingers that wrap around to the exterior surface of the shell 10 and extend down between the respective conductors C. These fingers are grounded and act to electrically isolate respective conductors C from one another.

Rather than applying a uniform voltage across large areas of the wall 14 of the shell 10 as do the prior art conductors C, it has been found to be beneficial to utilize contoured actuators 40, as illustrated in FIGS. 4, 4a, 6 and 6a, to apply voltage signals to the shell 10. The actuators 40 are shaped or contoured to over-lie areas of the shell wall 14 that are preferably subject to substantially uniform stresses. However, at the very least, the actuators are placed so as to over-lie areas of the shell wall 14 in which the stress gradient is relatively gradual. Preferably, the outlines of the actuators 40 are congruent with and do not intersect the stress gradient contour lines 18. However, as can be appreciated from viewing FIGS. 4, 4a, 6 and 6a in light of FIGS. 5 and 5a, it is not necessary that the boundaries of the actuators 40 follow the stress gradient contour lines 18 exactly. Rather, the emphasis in specifying the boundaries of the actuators 40 is to minimize the number of stress gradient contour lines 18 that the boundaries of the actuators 40 will intersect. This specificity ensures that driving voltages applied to the shell wall 14 will be applied to areas of the shell wall 14 that are subject to substantially uniform stress.

The actuators 40 of the present invention are centered precisely on the respective anti-nodes A of the shell 10 and have boundaries congruent with the stress gradient contours lines 18 as described above. By placing the actuators 40 at the anti-nodes A, which are spaced at 90° from each other, the voltage signals applied to the shell wall 14 cause deformations in the shell 10 directly along the nodal diameters 26, 28. This arrangement imposes the maximum deformation per unit volt applied to the wall 14 of the shell 10. All voltage differentials are imposed upon the shell 10 by respective pairs of diametrically opposed actuators 40 along the respective nodal diameters 26, 28. Applying diametrically opposed voltage differentials to the shell 10 effectively doubles the magnitude of the driving or corrective signals that are applied.

Voltage signals imposed on the shell 10 by the actuators 40 include a component intended to impose the desired mode of oscillation upon the shell 10 and a component that is intended to correct any variations in the mode of oscillation of the shell 10 and bring it back to its desired mode of oscillation. Typically, at least one of the actuators 41 applied to a resonating shell 10 is split into two electrically isolated crescents or halves 41a and 41b. See FIGS. 6 and 6a. The halves 41a, 41b of the split actuator 41 are symmetrically arranged on either side of the anti-node A. The split actuator 41 is useful in applying unsymmetrical voltage signals to the wall 14 of the shell 10 so as to drive the oscillations of the shell 10 back to the desired mode of oscillation.

The specific size, location, and boundary of each actuator 40 are directly related to both the impedance of the driving circuitry and the desired system Q value. The size, location, and boundary of the actuators 40, 41 should be carefully arranged so that the power requirements of the actuators 40, 41 do not exceed the power that the drive circuitry of the gyroscope is capable of providing. In addition, the inherent Q value of the material of the resonating element or shell 10 and the desired Q value for the system as a whole should concurrently be taken into account when specifying the size and location of the actuators 40, 41.

The specific size and location of the actuators 40, 41 are in large part dependent upon the amount of power required to drive the shell 10 of the preferred embodiment in its preferred mode of oscillation. The geometry and rigidity of the shell 10 influences the amount of power required to cause the desired deflections and subsequent oscillations in the shell 10. In order to deflect the wall of a resonating element made of a piezoelectric material so as to impose a desired mode of oscillation, a voltage differential must be set up in the piezoelectric material. In the case of the shell 10, this requires that a voltage differential be set up between the actuators 40, 41 and a grounding conductor G applied to the inner surface of the shell 10. Generally speaking, the larger the actuator 40, 41 (i.e. the more surface area it has), the larger the voltage differential that may be set up across the shell wall 14. Both a desired system Q value and a desired power requirement may be achieved by independently varying the surface area and height of the actuators 40, 41.

Applying a uniform voltage signal to the shell wall 14 across numerous areas of the shell wall 14 subjected to varying levels of stress may cause a significant decrease in the Q value of the oscillating shell 10. Ideally, the actuators 40, 41 would be placed on the shell wall 14 over an area that is subject to a substantially uniform stress when the shell 10 is oscillating. Applying the actuators 40, 41 over an area of substantially uniform stress minimizes the decrease in the system Q value. But since the stresses present in an oscillating shell wall 14 vary continuously, even an actuator 40, 41 having a small surface area will cover numerous discrete areas of substantially uniform stress. As the area of an actuator 40, 41 is increased, so does the number of areas of uniform stress covered by the actuator. Likewise, the drop in the system Q value will also increase. Therefore it is preferred to minimize the area of the actuators 40, 41. Consequently, it is important that the size of the actuators 40, 41 be carefully tailored to the power and Q value requirements of the gyroscope.

Along with the size of the actuators 40, 41, distance from the top edge 16 of the shell 10 to the actuators 40, 41 is also a significant factor in meeting the power requirements of the oscillating system. For instance, placing the actuators 40, 41 nearer the bottom of the shell 10 decreases the power requirement for driving the oscillations of the shell 10. Even though the shell wall 14 is stiffer nearer the bottom thereof, voltage differentials applied to the shell wall 14 near the bottom result in a larger deflection of the shell wall 14 near its upper edge 16 per unit volt. Conversely, where the actuators 40 are placed nearer the top 16 of the shell wall 14, a larger voltage differential must be applied to the shell wall 14 to achieve the same deflection at the top edge 16 of the shell wall 14, i.e. achieving a comparable deflection at the top edge 16 of the shell wall 14 requires more volts per unit of deflection. Therefore, where the power requirements of a shell 10 are high (as where the actuators 40, 41 are near the top of the shell wall 14) the actuators will be correspondingly large and where the power requirements of a shell 10 are low (as where the actuators 40, 41 are nearer the bottom of the shell wall 14), the actuators will be correspondingly small. It must be kept in mind that the actuators 40, 41 must be centered upon and symmetrical about, the respective anti-nodes A.

Furthermore, the actuators 40, 41 of the present invention are applied to the resonating element 10 at predetermined locations upon the shell wall 14 that are defined by boundaries that are at least in part substantially congruent with the stress gradient contour lines 18 that delineate areas of the resonating element 10 that are subject to substantially uniform levels of stress when the gyroscope is rotationally stationary. In other words, the edges of the actuators 40, 41 are at least in part congruent with the stress gradient contour lines 18 that identify areas of substantially uniform stress in the resonating element.

The actuators' 40, 41 position with respect to the upper edge 16 of the shell 10, or height, is preferably specified as a stress magnitude present at a particular stress gradient contour line 18. This stress magnitude may be specified directly by simply stating the desired stress, or it may be specified as a percentage of the maximum or minimum stress present in the shell wall 14 along the anti-node A. The actuators 40, 41 may be positioned at any point along the anti-node A depending upon the power requirements or impedance for the system, i.e. higher stresses generally tend to be higher up the shell wall 14 and result in lower impedances whereas lower stresses generally tend to be lower down the shell wall 14 and yield higher impedances. Given that the outlines of the actuators 40, 41 of the present invention are preferably substantially congruent to the stress gradient contour lines 18, it is useful to designate the width of the actuators 40, 41 by the percent deviation from the stress level that defines the height of the actuators 40, 41. In the low impedance embodiment of the present invention illustrated in FIGS. 4 and 6, the height of the actuators 40, 41 may be specified as a stress magnitude of 75% of the maximum stresses present in the shell wall 14 along the anti-node A. In this embodiment the width of the actuators 40, 41 are such that the portions of the shell wall 14 underlying the actuators 40, 41 of the preferred embodiment are subject to stresses that deviate no more than 12% from the defining stress magnitude of 75% of the maximum stresses present in the shell wall 14 at the anti-node A. Therefore, in this embodiment, the upper and lower boundaries of the actuators 40, 41 encompass an area of the shell wall 14 between the 87% and 75% of the maximum stress present at the anti-node A. As indicated above, both the height and the width of the actuators 40, 41 may be modified so as to meet the requirements of a specific application and therefore, the present invention is not to be limited to this preferred embodiment alone.

Where the stress gradients present in the shell wall 14 are not arranged as illustrated by stress gradient contour lines 18 in FIG. 5, it may be necessary to specify an additional limitation on the size of the actuators 40, 41. This additional limitation is the span of the actuator 40, 41. The span of an actuator is the distance on either side of the anti-node A to which the actuator 40, 41 extends. The span can be specified as a distance or as an angle. As a practical matter, the actuators 40, 41 must be spaced apart from the pick-offs 50 to avoid capacitative coupling therebetween. In order to maintain this spacing, it is preferred that the actuator span no more than 50°, i.e. no more than 25° to either side of the anti-node A. However, it must be noted that the preferred span of 50° may be exceeded so long as any interference between the actuators 40, 41 and the pick-offs 50 remains below acceptable levels. Acceptable levels of interference are those in which the signal to noise ratio in the gyroscope is sufficiently low so as to allow the gyroscope to function within its specified tolerances.

Figure 4A:
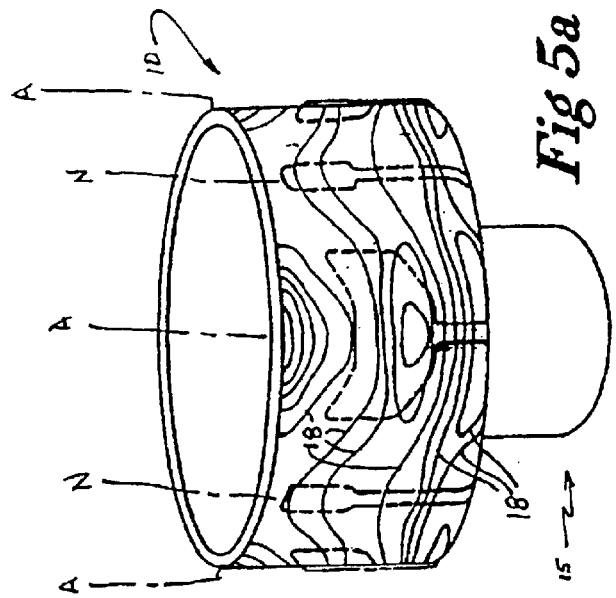
FIG. 4a is a perspective view of an axi-symmetric shell similar to that illustrated in FIG. 1 showing an additional embodiment of actuators and pick-offs constructed and arranged according to the present invention applied thereto.
Figure 6A:
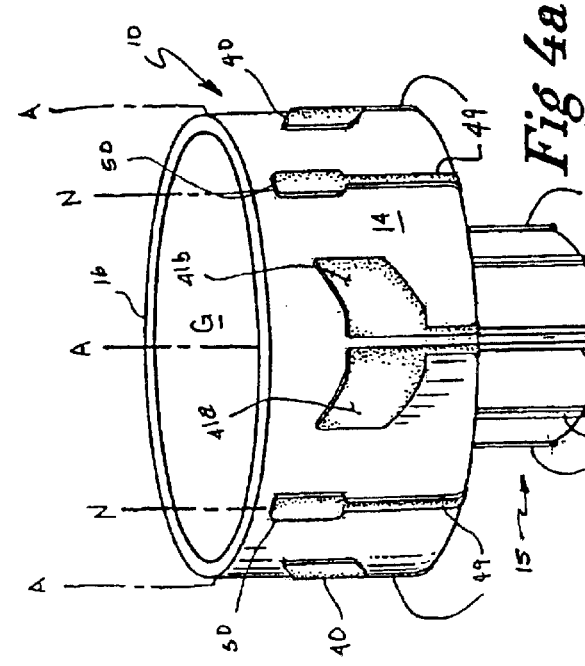

In the preferred embodiment illustrated in FIGS. 4a and 6a, actuators 40, 41 are designed for a high impedance application. In this embodiment the height of the actuators 40, 41 is defined as the stress magnitude that is 25% of the maximum stress present in the shell wall 14 along the anti-node A. A preferred range for the boundaries of the actuators 40, 41 is between 10% and 40% greater than the stress magnitude that defines the height of the actuator. In this preferred embodiment, the boundaries of the actuators 40, 41 are 25% greater than the stress magnitude that defines the height of the actuators. Therefore, the actuators 40, 41 of this embodiment cover an area of the shell wall 14 that is subject to between 25% and 50% of the maximum stress in the shell wall along the anti-node A.

Where the stress gradient contour lines 18 that preferably define the upper, lower, and lateral boundaries of the actuators 40, 41 are tortuous or would result in a needlessly complex shape for an actuator 40, 41 it may simpler to specify the size, shape and location of the actuators in a more empirical manner. Using the foregoing principles of placement of the actuators as a guideline, it can be seen that the actuators 40, 41 have been placed on the shell wall 14 in a location in which the stress gradient is relatively gradual. In this way, the actuators 40, 41, overlie fewer areas of discrete stresses. Furthermore, the upper and lower boundaries of the actuators are applied in such a manner that they are substantially congruent to the stress gradient contour lines 18 present immediately adjacent thereto. Given that the size of the resonating element 10 and hence the size of the actuators 40, 41 may vary greatly with given applications and requirements, it is preferred that when specific dimensions for an actuator 40, 41, pick-off 50 or lead 49 are given, that they be stated in terms of a percentage of the diameter of the resonating element 10. In the embodiment illustrated in FIGS. 4a and 6a, the vertical dimension of the actuators 40, 41 along the anti-node A is approximately 20% of the diameter of the resonating element 10. The lateral or horizontal dimension of the actuators 40, 41 in this embodiment is approximately 40% of the diameter of the resonating element 10. Where, as in this case, the diameter of the resonating element is approximately 0.750 inches, the distance between the upper and lower boundaries of the actuator 40, 41 is approximately 0.150 inches. The span or horizontal dimension of actuators 40, 41 illustrated in FIG. 5a is approximately 0.30 inches, or 0.150 inch to either side of the anti-node A.

With the foregoing principles regarding the placement and size of an actuator in mind, where a high Q value for a resonating system is required and where the power requirements for driving the system are also high, a number of narrow actuators 40, 41 may be nested to provide a high system Q value while also providing sufficient surface area to satisfy the high drive power requirements. This alternate embodiment (not shown) would, for example, place a first nested actuator conductor at a height of 65% of the maximum stress present in the shell wall 14 and a second nested actuator at a height of 80% of the maximum stress present in the shell wall 14. As can be appreciated, where the actuators 40, 41 are comprised of multiple nested actuator conductors, the widths of each nested actuator conductor will be narrower than where the actuators are a single monolithic applied film conductor. Each portion of these nested actuators would have a width of approximately 5% greater than the height-defining stress. While it is possible to nest any number of actuator portions in the manner described above to create a single actuator 40, 41, it is preferable to limit the number of nested actuator portions to no more than three and preferably to two in a given actuator 40, 41. It is important to note that each portion of the nested actuators may be driven at different voltage levels to equally distribute the contributions to the vibration energy of the oscillating shell 10.

It is to be noted that there is no single preferred shape for the actuators 40, 41. Rather, the size and shape of the actuators 40, 41 are dependent on the shape of the stress gradient contour lines 18 and the power requirements of the oscillating system.

Driving and sensing circuitry (not shown) associated with the actuators 40, 41 generates the drive component of the voltage signals applied to the shell 10 and also utilizes voltage signals derived from the pick-offs 50 described below to generate the corrective component of the voltage signals applied to the shell 10 through the split actuator 41. This circuitry also outputs rate of rotation data derived from the pick-offs 50 of the gyroscope and is preferably capable of compensating for changes in the resonant frequency of the shell 10 or equivalent resonating element due to temperature fluctuations. Circuitry suitable for operating a gyroscope according to the present invention is disclosed in U.S. Pat. Nos. 4,479,098 and 4,578,650, which are commonly assigned with the present invention and which are hereby incorporated by reference.

A pick-off 50 constructed and arranged according to the present invention is an applied film conductor centered upon the nodes N of the shell wall 14. As the shell wall 14 at nodes N is, by definition, subjected to minimal and preferably, substantially zero stress during rotationally stationary steady state operation of the gyroscope (see FIGS. 5, 5a), the pick-offs 50, centered exactly at the nodes N in an area of minimal or substantially no stress, will sense minimal or substantially no voltage signals from the piezoelectric material of the shell 10 when the gyroscope is rotationally stationary. Pick-offs 50 are preferably kept as narrow as possible to ensure that the voltage signals being conducted by the pick-offs 50 are sensed at the nodes N of the shell wall 14. In the embodiment illustrated in FIG. 4a, the pick-offs 50 have a width between 4% and 8% of the diameter of the resonating element 10. Supposing that the resonating element in FIG. 4a is approximately 0.750 inches in diameter, the pick-off 50 would be approximately 0.050 inches wide. In this embodiment, the vertical dimension of the pick-off conductor 50 has been arbitrarily set at 0.150 inches. It is to be noted that these dimensions are illustrative only and that the actual size of the pick-offs 50 may vary so long as the pick-offs 50 do not negatively interact with the actuator conductors 40, 41 or ground conductor G and continue to conduct a net voltage signal that is minimal or substantially zero when the gyroscope is rotationally stationary as indicated above. However, it is preferred that the pick-off conductor 50 have a vertical dimension or a vertical placement along the node N that is somewhat spaced away from the upper edge 16 of the shell wall 14. This is to prevent the added mass of the pick-off conductor 50 from negatively affecting the mode of oscillation of the resonating element 10 has described herein below in conjunction with FIG. 8.

In practice it can be difficult to form a pick-off 50 that is precisely centered at the node. And where the pick-offs 50 are not precisely centered on the nodes N, the pick-offs 50 will overlie portions of the shell wall 14 subject to stresses due to the oscillation of the shell 10. In these cases it may be necessary to 'tune' the pick-offs 50 so that the pick-offs 50 will conduct a minimal voltage signal that is preferably substantially zero when the gyroscope is rotationally stationary. Applying a balancing conductor 51 to the shell wall 14 in electrical communication with pick-off 50 and trimming the conductor 51 to adjust the voltage signal sensed at the node by the pick-off 50 accomplishes tuning. The size and placement of a balancing conductor 51 is carefully arranged to damp out uneven voltage responses output by the piezoelectric material. The use of a balancing conductor 51 helps ensure that a pick-off 50 will conduct a voltage signal of preferably substantially zero when the gyroscope is rotationally stationary.

When the gyroscope is rotationally displaced, the material of the shell wall 14 at the nodes N will be subjected to stresses and deformations that normally occur at or near the anti-nodes A, thereby causing the piezoelectric material of the wall 14 to emit voltage signals that are sensed by the pick-offs 50. As indicated above, the displacement of the nodes N with respect to the pick-offs 50 may be due to the rotation of the gyroscope or due to distortions in the shell 10 from environmental conditions such as temperature fluctuation. The control circuitry associated with the gyroscope described above uses the output of pick-offs 50 to determine both the rate and direction of the rotation of the gyroscope, to correct temperature induced fluctuations in the resonant frequencies of the shell 10, to correct temperature induced fluctuations in the voltage response of the piezoelectric material of the shell 10, and to ensure that the voltage signals for driving the oscillations and for correcting the oscillations are maintained in the proper phase relationship.

One benefit to using very thin pick-offs 50 at the nodes N is that the thin pick-offs 50 are more able to accurately sense the amplitude of the vibrations of the wall 14 of the shell 10 than the broad conductors C used as pick-offs in the prior art. Prior art conductors C average the voltage signals sensed over a relatively large area of the shell 10. These sensed voltages include signals due to rotation of the gyroscope and signals due to uneven voltage response in the piezoelectric materials of the shell 10 at the edge of the conductors C. As described above, wider and larger conductors C overlie more discrete stress gradients in the shell wall 14 with the result that large signals sensed at one location of the conductor C will tend to be undesirably cancelled or augmented by signals sensed at other locations of the conductor C. Conversely, thin pick-offs 50, because they are thin, are able to sense the voltage signals due to a vibration in the shell wall 14 at a more clearly defined and specific location on the wall 14 of the shell 10, thereby increasing both the accuracy and the precision of the gyroscope.

Another benefit to using both thin pick-offs 50 and contoured actuators 40, 41 in the arrangement of the pick-offs 50 and the actuators 40 illustrated in FIGS. 4, 4a, 6 and 6a, is that the actuators 40 and pick-offs 50 act as a physical filter for unwanted modes of oscillation. As described, the actuators 40,41 impose deformations in the shell 10 only in the desired directions, i.e. along the desired nodal diameters 26, 28. In addition, the low impedance pick-offs 50 siphon off voltage signals due to deformation of the shell 10 at the nodes N, thereby reducing the propagation of voltage signals along the wall 14 of the shell 10. The filtering action of the arrangement of the actuators 40 and the pick-offs 50 allows the shell 10 to operate on a more efficient basis as fewer unwanted modes of oscillation need be damped out.

Another method for physically filtering out unwanted modes of oscillation involves altering the structure of the resonating element such as by augmenting the wall 14 of the shell 10 in a manner which causes the anti-nodes A to oscillate at a lower resonant frequency than the remainder of the shell 10. See FIGS. 7 and 8. This is accomplished by increasing the wall 14 thickness at the anti-nodes A, by adding crenellations (not shown) to the upper edge 16 of the wall 14 of the shell 10 at the anti-nodes, or by attaching weights W to the wall 14 of the anti-nodes N. The increased mass and altered geometry change the physical characteristics of the wall 14 at the anti-nodes A and increases the period required for that portion of the wall 14 of the shell to resonate through a single cycle, thereby predisposing the shell 10 to oscillate in its simplest mode of oscillation, in this case at n=2. Arranging and constructing the shell 10 in such a manner improves the efficiency of the vibrations of the shell 10 and increases its Q value.

Figure 14:
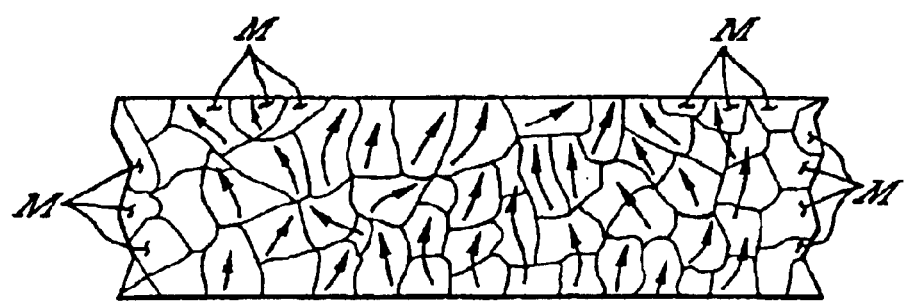
FIG. 14 is a schematic representation of individual grains of a piezoelectric material showing the random nature of the polarity of the grains.
Figure 15:
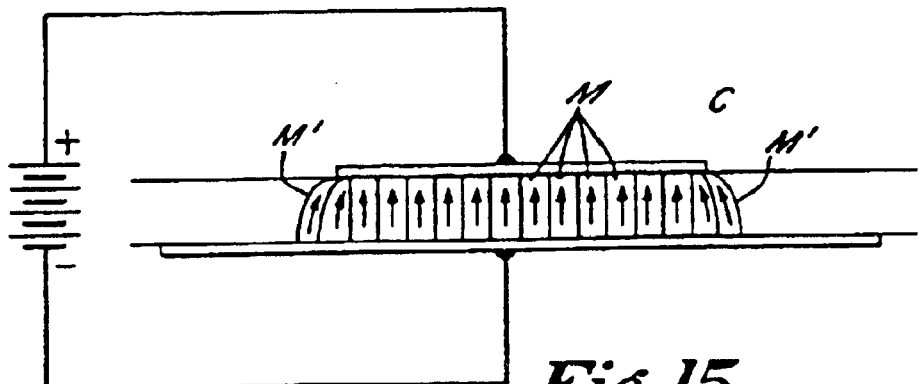
FIG. 15 is a schematic representation of a prior art method of polarizing the grains of a piezoelectric material.

In addition to the improvements upon the structure of the actuators 40 and pick-offs 50, improvements have been made in the accuracy and precision of the voltage response of the piezoelectric material of the shell 10. As illustrated in FIG. 14, a piezoelectric material, such as that from which a shell 10 may be fabricated, is comprised of discrete grains M of a piezoelectric material. Each grain M is only sensitive to deformations that occur in a specific direction. This polarity is indicated in FIG. 14 by the dark arrows within each grain. It is known to apply a strong DC voltage crosses the piezoelectric material between a conductor C and an inner, thin film ground connection G in order to bias the directions of sensitivity or polarity of the individual grains M of the piezoelectric material in a single direction as illustrated in FIG. 15. The uniformity of polarity in the grains M of piezoelectric material improves the voltage response of the piezoelectric material due to deformations of the material by creating a situation in which the collective voltage responses of the grains M are additive rather than destructive.

However, it is generally the case that the grains $M^1$ of piezoelectric material near or at the edge of the conductors C across which the biasing DC voltage is applied will not receive the same bias as do the grains M of piezoelectric material located near the center of the conductors C. See FIG. 15. Because of this uneven biasing of the grains of piezoelectric material M, the voltage response of a shell 10 such as the prior art device illustrated in FIGS. 1 and 3 will be uneven. This uneven voltage response of the piezoelectric material may cause unwanted deformation of the shell 10 when voltage is applied to the shell 10 by the conductors C being used as actuators, thereby lowering the Q value of the shell 10 and inducing unwanted oscillation modes. In addition, the uneven polarization of the grains M may also result in inaccurate voltage readings from the conductors C being used as pick-offs, thereby corrupting the rotation data output by the gyroscope. What is more, because the voltage response of a piezoelectric material is proportional to the deformation or stress applied to the material, the uneven voltage response due to the uneven biasing of the grains M may become more pronounced as the stresses present in the shell 10 increase.

Figure 16:
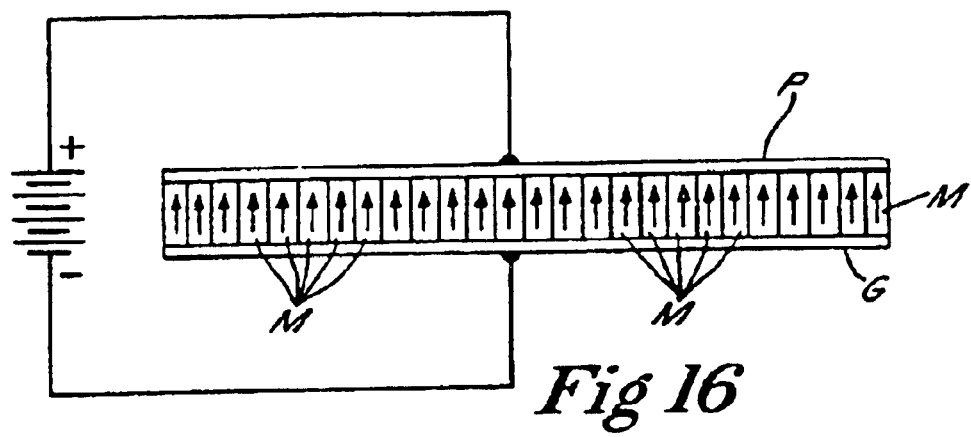
FIG. 16 is a schematic representation of the uniform polarization of the grains of a piezoelectric material according to the present invention.
Figure 17:
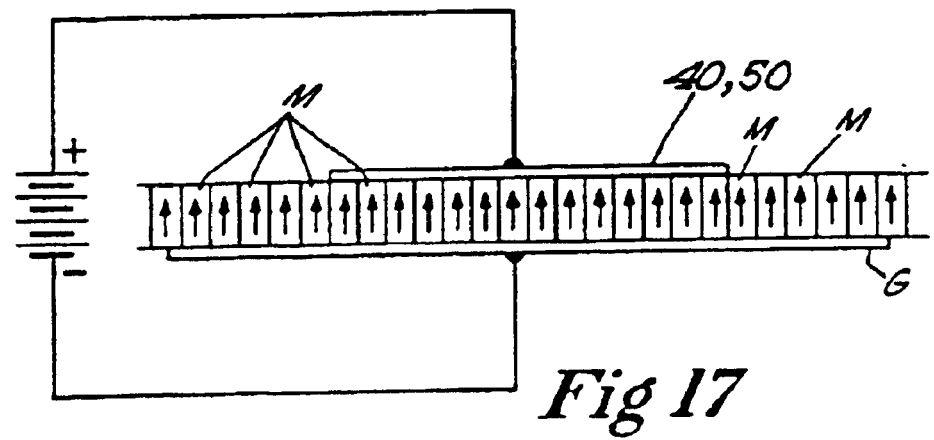
FIG. 17 is a schematic representation of the uniformly polarized grains of a piezoelectric material wherein a portion of the applied film conductor used to uniformly polarize the piezoelectric material has been etched away to form an actuator or pick-off according to the present invention.

FIGS. 16 and 17 illustrate an improved method for biasing the grains M of the piezoelectric material of the shell 10. In FIG. 16 it can be seen that the entire inner and outer surfaces of the shell 10 are coated with respective layers of conductors. In FIG. 16 the reference numerals 40 and 50 in addition to denoting the actuator 40 and pick-off 50 of a shell 10, indicate the thin film conductor material that is applied to the outer surface of the shell 10 and the reference character G indicates the grounded thin film conductor material applied to the inner surface of the shell 10 so as to create a voltage conduction path through the piezoelectric material of the shell 10. A suitably large DC voltage is applied across the piezoelectric material between the applied conductors 40, 50 and G to polarize of the respective grains M of the piezoelectric material in a desired direction (indicated by the arrows in FIGS. 14-17). Biasing the piezoelectric material of the entire shell 10 ensures that no irregularly biased grains $M^1$ as illustrated in FIG. 15 exist in the shell. Once the entire shell 10 has been suitably polarized, unnecessary thin film conductor material is removed as by chemical or abrasive etching to give the actuators 40, 41 and pick-offs 50 their desired shape and locations as has been represented schematically in FIG. 17. As can be seen from FIG. 17, no irregularly biased grains $M^1$ remain in the piezoelectric material of the shell 10 at or near the actuators 40 or pick-offs 50, thereby ensuring a more uniform and predictable voltage response.

In addition to the improved biasing of the piezoelectric material of the shell 10, the gyroscope of the present invention has been made more reliable by improving the durability of the conductive leads that connect the actuators 40 and pick-offs 50 to the control circuitry of the gyroscope. In the prior art it was known to utilize very thin solid wires 23 soldered or compression bonded between the grounded applied film conductors G, actuators 40, and pick-offs 50 and the control circuitry, respectively. See FIG. 1. The use of solid wire conductors 23 has proved unreliable in that the wires have shown the tendency to break over time due to flexure of the wires. In addition, the material used to secure the wire conductors to the conductors C and the stiffness of the wire conductor itself have a tendency to reduce the Q factor of the shell 10 by changing the physical characteristics of the shell 10. As illustrated schematically in FIGS. 4 and 6, an applied film conductor 49 runs from the respective actuators 40 and pick-offs 50 down the sidewall 14 of the shell 10 in order to make the requisite electrical connections to the drive circuitry. Preferably the conductor paths or leads 49 emanating from the respective actuators 40 and pick-offs 50 will continue down the stem 18 of the shell 10 as shown in FIGS. 4 and 6. The applied film conductor materials from which these improved conduction paths 49 are fashioned do not significantly affect the mode of oscillation of the shell 10. Furthermore, because all of the necessary electrical connections between the actuators 40, pick-offs 50, and the control circuitry are made on the stem 18 of the shell 10 or at least substantially near the base of the shell 10 where there is substantially no vibration or movement of the shell wall 14, the electrical connections themselves are more likely to last longer because they are not subjected to repeated stresses which may eventually fracture a solid wire conductor 23. In the embodiment illustrated in FIG. 4a, the conduction paths 49 have a width that is between 1% and 4% of the diameter of the resonating element. Supposing the resonating element 10 illustrated in FIG. 4a to be 0.750 inches in diameter, the conduction paths 49 would be approximately 0.0125 inches wide. The actual width of the conduction paths 49 may be varied up or down depending on the requirements of a particular application keeping in mind that the conduction paths 49 are preferably narrower than the respective pick-offs 50 and actuators 40, 41 to which they are attached.

Figure 9:
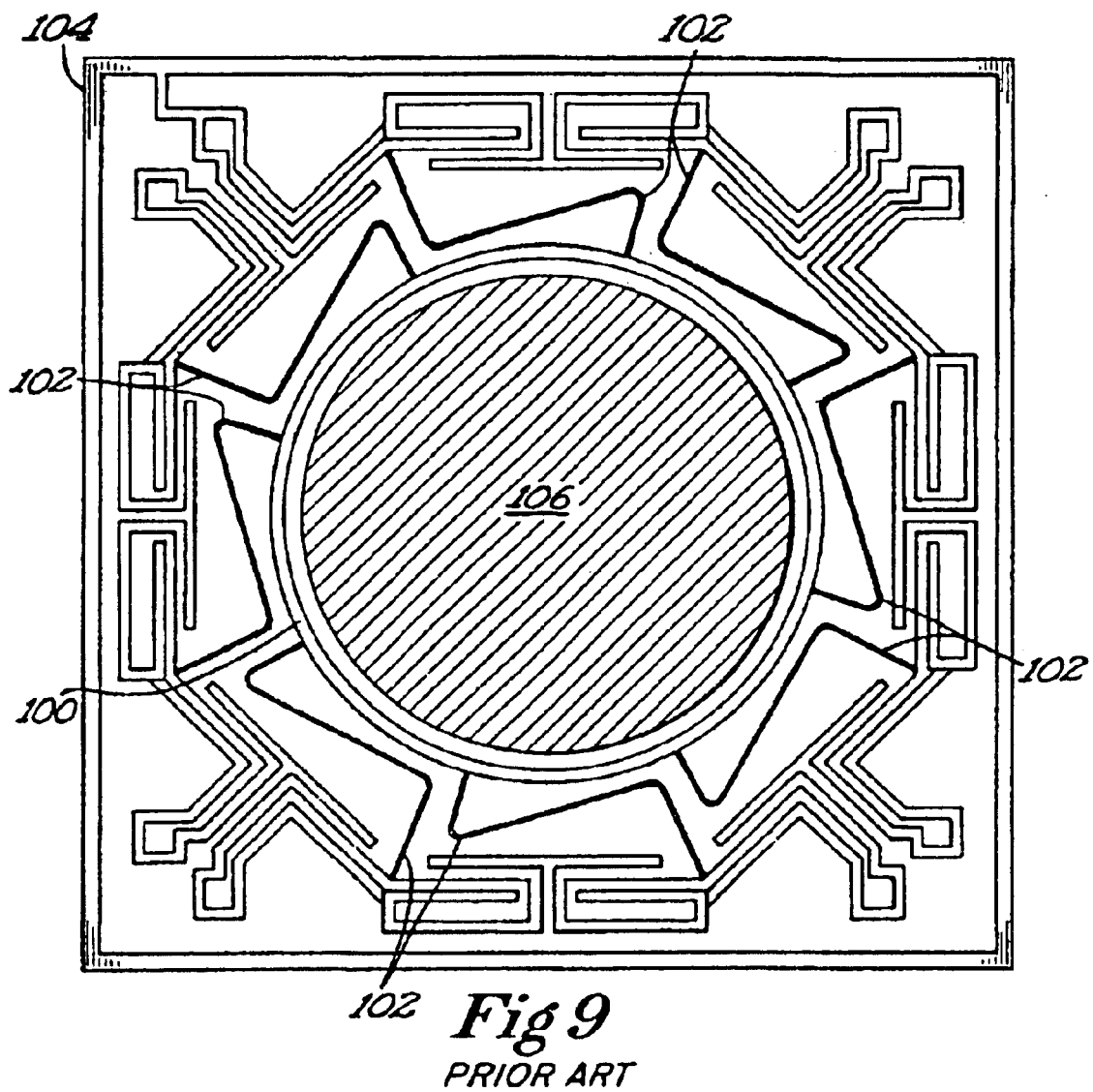
FIG. 9 is a plan view of a prior art resonating element of an oscillating ring rate gyroscope.

An alternate embodiment of the present invention is described in conjunction with FIGS. 9–13. FIG. 9 illustrates the resonating element of a vibrating ring gyroscope of the prior art. This resonating element comprises a ring 100 that is supported from a support frame 104 at circumferentially uniformly spaced intervals by a number of radially compliant spokes 102. Typically, a resonating element 100 such as the one illustrated in FIG. 9 is manufactured from a single thin sheet of a relatively rigid material such as a crystalline silicon wafer of the type utilized in the manufacture of computer chips. The support frame 104 of this resonating element is typically mounted to a support structure 105 of a thermally matched material; in this case a glass material. See FIG. 11. A magnetic core 106, which is in this case cylindrical, is received through a central aperture formed by the ring 100. This core 106 imposes a strong magnetic field around and through the ring 100.

With reference to FIGS. 9 and 10, current carrying 112 conductors are formed into the top side of the resonating element 100 by means of well known deposition techniques so as to form a plurality of identical conductor loops 110 that are uniformly spaced around the circumference of the ring 100 between adjacent spokes 102. The uniform conductor loops 110 are each comprised of a single conductor that passes down a spoke 102, around the perimeter of the ring 100, and back up an adjacent spoke 102. Conductive pads 111 permit bonding of the conductor loops 110 to a plurality of wires 103 which convey electrical currents between the conductor loops 110 and the drive and sensing circuitry (not shown) of the gyroscope. Each spoke 102 also has a neutral conductor loop 113 that acts to minimize capacitative coupling between adjacent conductor loops 110. Taking advantage of the principles of electromagnetism, currents passed through a selected current loop or loops 110 disposed around the ring 100 will react with the magnetic field created by the core 106 to cause a reactionary displacement of the ring 100 itself. Likewise, the displacement of the preferred mode of oscillation of the ring 100 by a rotational acceleration of the gyroscope will induce a current in a given conductor loop 110. Drive and sensing circuitry (not shown) of the type described above is used to impose the desired mode of oscillation upon the ring 100 and to sense voltages generated by rotation of the gyroscope.

Figure 12:
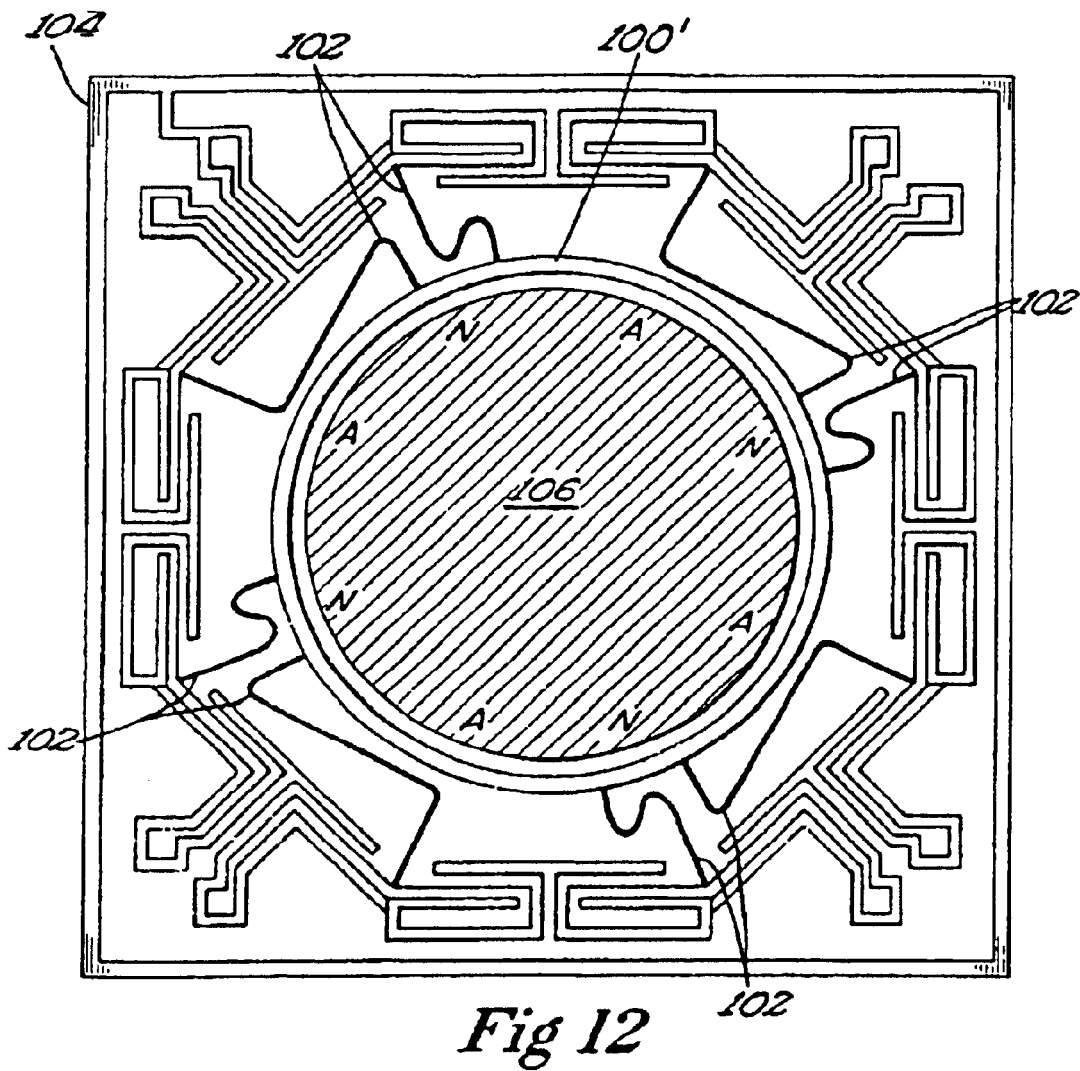
FIG. 12 is a plan view of a resonating element of an oscillating ring gyroscope arranged and constructed according to the present invention.

Conductor loops 110 of the prior art device illustrated in FIG. 9 are identical all around the circumference of the ring 100 and are used both as actuators and as pick-offs. These conductor loops 110 are similar to the conductors C illustrated in FIG. 3 in that their size and arrangement, though symmetrical, is not tied to the location of the nodes N and antinodes A of the oscillating ring element 100. The arrangement and the relative size of the actuator and pick-off loops 110 in the prior art ring gyroscope illustrated in FIGS. 9 and 11 tend to create an undesirable amount of error in the signals sensed by the pick-off loops. Incorporating the principles of the present invention into a ring gyroscope yields a resonating element $100^1$ arranged as illustrated in FIG. 12. Respective pairs of spokes 102 symmetrically bracket the nodes N of the ring $100^1$, thereby ensuring that the pick-off conductor loops 110 are also positioned over the nodes N in the same manner as are pick-offs 50 of the embodiments illustrated in FIGS. 4, 4a, 6, and 6a. Likewise, actuator conductor loops 110 are positioned symmetrically over the anti-nodes A of the ring $100^1$ in the same manner as are the actuators 40, 41 in the embodiments illustrated in FIGS. 4, 4a, 6, and 6a. In this manner the embodiment illustrated in FIG. 12 minimizes the effects of discontinuities in the magnetic field due to imperfections in the material from which the core 106 is manufactured, filters out unwanted modes of oscillation, and improves the Q value of the oscillating system.

Figure 13:
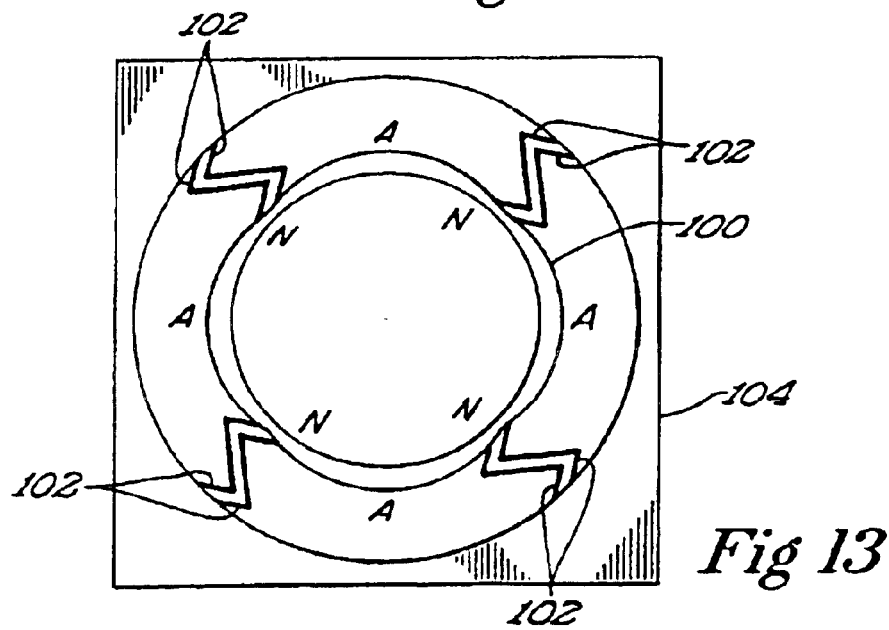
FIG. 13 is a top plan view of an oscillating ring gyroscope having thickened cross-sections at the anti-nodes of the ring.

FIG. 13 is an illustration of a resonating element similar to the ring 100 illustrated in FIG. 9. The ring $100^{11}$ of FIG. 13 has its walls thickened at the anti-nodes A of its preferred mode of oscillation in order to physically filter out unwanted modes of oscillation. This modification may also be incorporated within the ring $100^1$ illustrated in FIG. 12.

Figure 18:
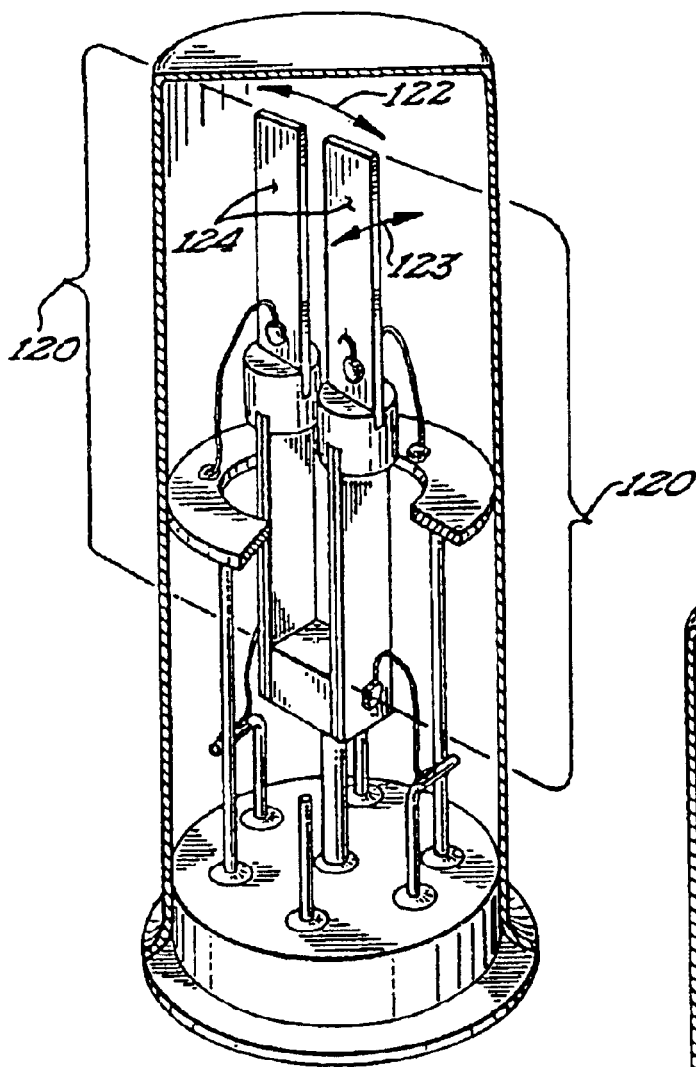
FIG. 18 is a partial cut-away perspective view of a prior art turning fork type of rate gyroscope.

FIG. 18 illustrates a typical prior art tuning fork type of angular rate sensor such as that patented by Kimura in U.S. Pat. No. 5,014,554. This type of sensor operates by causing the tines 120 to oscillate as indicated by arrow 122. Rotation of the sensor causes the sensing elements 124 to flex in the direction indicated by arrow 123 and produce voltage signals that are proportional to the rate of rotation. However, the oscillation of the tines 120 in the plane indicated by arrow 122 also imparts at least some small amount of flexure to the sensing elements 124 in the plane defined by arrow 123 to the sensing elements 124. This small amount of flexure is sufficient to cause the piezoelectric materials from which the sensing elements 124 are made to produce a small voltage signal that erroneously indicates that there is some amount of rotation occurring.

Figure 19:
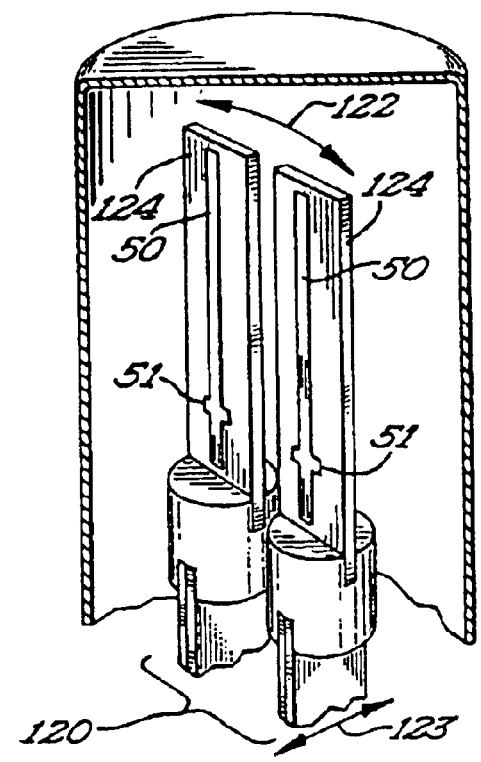
FIG. 19 is a close up, partial cut-away perspective view of the sensing elements of a tuning fork type rate gyroscope having pick-off conductors constructed and arranged according to the present invention.

FIG. 19 illustrates the application of the principles of the present invention to the prior art sensor of FIG. 18. Pick-offs 50 are placed at the very center of the beam sensing elements 124 so as to minimize voltage signals arising from flexure in the plane indicated by arrows 122. The placement of the pick-off 50 in the center of the beam sensing elements 124 takes advantage of the well-known principle of a neutral axis that runs through a beam under stress. In this case, the neutral axis of the beam sensing elements 124 correspond to the nodes N illustrated in FIGS. 2, 4, 4a, 6, and 6a. Though the placement of a thin pick-off 50 along the center of sensing element as illustrated in FIG. 19 should be sufficient to nullify most undesirable voltage signals, it may be necessary to balance the pick-off 50 using a balancing conductor 51 as described above. The balancing conductor 51 is an applied film conductor which is applied to the sensing elements 124 in electrical communication with the pick-offs 50 in such a manner as to nullify net voltage signals that are due to flexure of the sensing elements in the plane indicated by arrows 122. Portions of the balancing conductors 51 will be removed, as by etching, so as to ensure that the pick-offs 50 sense a net voltage of substantially zero when the gyroscope illustrated in FIG. 19 is rotationally stationary.

Figure 20:
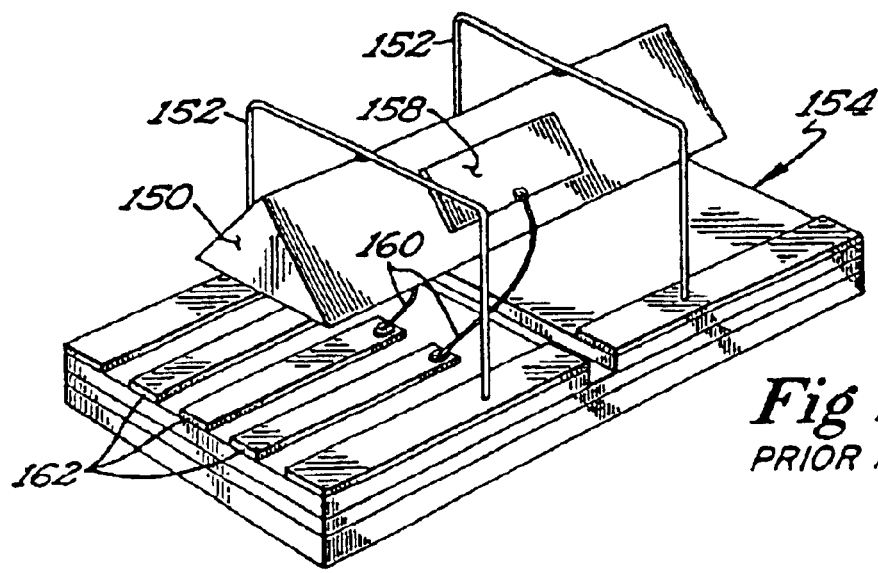
FIG. 20 is a perspective view of a bar type resonating element of a prior art angular rate sensing gyroscope.

FIG. 20 illustrates yet another type of prior art gyroscope patented in Japan by Murata Electric Corporation. In this device, the resonating element 150 is a piezoelectric bar. Though in the illustrated embodiment the resonating element 150 is in the form of an equilateral triangular prism, other elements having various polygonal cross-sections may also be used, including square and hexagonal bars. The resonating element 150 is suspended over a base 154 from a pair of support members 152 which are in this case wire arches. Conductive elements 158 are secured to each of the respective sides of the resonating element 150. Wires 160 connect the conductive elements 158 to a number of conductive pads 162 that electrically connect the wires 160 to the drive and sensing circuitry (not shown) used to operate the gyroscope. It should be noted that although element 150 is fashioned of a piezoelectric material itself, it is possible to fashion the element 150 from a non-reactive elastic material. In this case, piezoelectric elements having roughly the same size and shape as the conductive elements are secured to the surface of the elastic element and the conductive elements are then secured thereover in much the same manner as described above.

Figure 21:
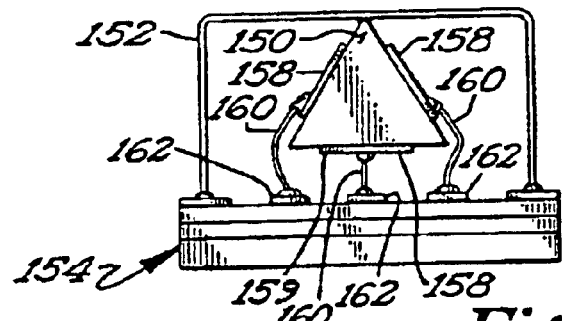
FIG. 21 is an end view of the prior art angular rate sensing gyroscope of FIG. 12.

The element 150 is made to oscillate in a preferred mode of oscillation by a drive element 158', which is in this case the lowermost element 150. See FIG. 21. The remaining elements 158" are used to sense the vibration and rotation of the gyroscope. When the gyroscope of FIGS. 20-21 is rotationally stationary, the sensing elements 158" should each sense the same voltage signals and should therefore report a net differential current output of zero. When the gyroscope is rotated about its sensitive axis, the sensing elements 158" sense a positive or negative net current output that is proportional to the rate of rotation of the gyroscope. But, as can be seen in FIGS. 12 and 13, conductive elements 158 occupy large portions of the respective forces of the element 150. As described above in conjunction with the shell 10 of the preferred embodiment of the present invention, applying a relatively large sensing element 158" over a relatively large surface area of a vibrating element 150 will decrease the Q factor of the vibrating system.

Figure 22:
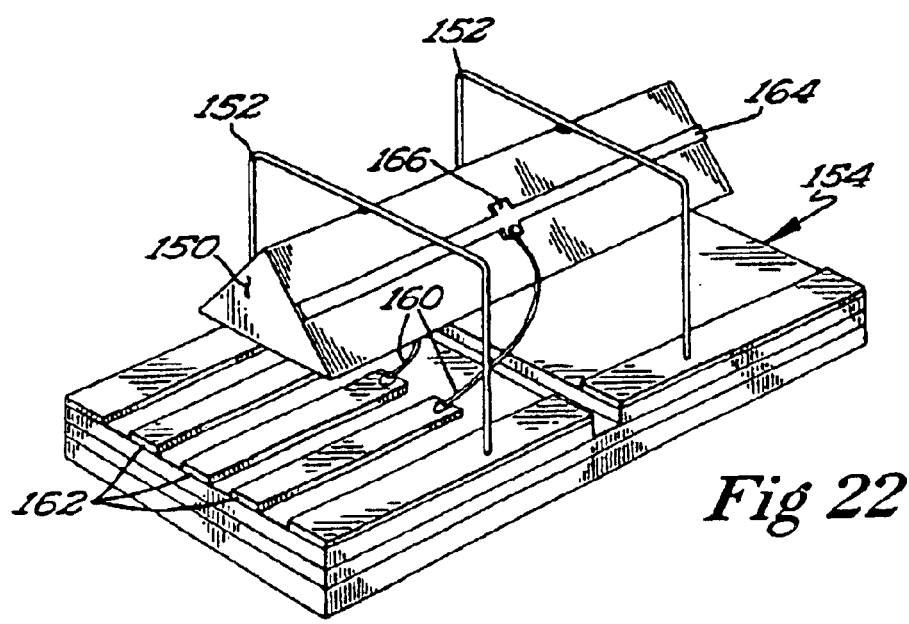
FIG. 22 is a perspective view of a bar type resonating element of an angular rate sensing gyroscope having pick-off conductors constructed and arranged according to the present invention.

Referring now to FIG. 22, the incorporation of the principles of the present invention may be seen as applied to a prior art gyroscope such as the one illustrated in FIGS. 20-21. The new conductive elements or pick-offs 164 are disposed in symmetrical locations, in this case along the center of the face of each of the sides of the prismatic resonating element 150. In order to ensure that pick-offs 164 sense a substantially net differential current output of zero when the gyroscope is rotationally stationary, a balancing conductor 166 may be provided upon the surface of the resonating element 150. This balancing conductor 166 is electrically connected to the pick-off 164 and is carefully sized and located upon the resonating element 150 so as to cancel net differential voltage signals sensed by the pick-offs 164 when the resonating element 150 is oscillating in a rotationally stationary state.

This description is intended to provide specific examples of preferred and alternative embodiments that clearly disclose the principles of the present invention. Accordingly, the present invention is not to be limited to just these described embodiments or to the use of the specific elements described herein. All alternative modifications and variations of the present invention that fall within the spirit and broad scope of the appended claims are covered.

What is claimed is:

1. A gyroscope comprising:
    a resonating element arranged and constructed to oscillate at a resonant frequency;
    a voltage pick-off conductor applied to a predetermined area of said resonating element so as to sense net voltage signals proportional to a rate of rotation of said gyroscope when said gyroscope is rotated; and
    a voltage balancing conductor applied to a predetermined area of said resonating element and in conductive communication with said pick-off conductor, said balancing conductor being arranged and constructed to zero net voltage signals sensed by said voltage pick-off conductor when said gyroscope is rotationally stationary.

2. The gyroscope of claim 1 wherein said element exhibits piezoelectric properties and comprises one of a cylinder, a ring, and a bar.

3. The gyroscope of claim 2 wherein said resonating element comprises a triangular prism having three longitudinal sides, each longitudinal side having applied thereto a conductive element.

4. The gyroscope of claim 3 wherein two of said conductive elements are pick-off conductors.

5. A method of improving the uniform voltage response of a piezoelectric resonating element at a predetermined location upon said resonating element, said resonating element having a first surface and a second, opposing surface, said resonating element being solid between said first and second surfaces, the method comprising steps of:
    applying a first applied film conductor to the entire first surface of said resonating element;
    applying a second applied film conductor to the entire second surface of said resonating element;
    connecting said first and second thin film conductors to a DC voltage source; and
    applying a DC voltage of predetermined strength to said first and second applied film conductors so as to create a voltage differential between said first and second applied film conductors, said voltage differential uniformly modifying the voltage response of the piezoelectric material of the resonating element over substantially the entire area of the piezoelectric material located between the first and second thin film conductors.

6. The method of improving the uniform voltage response of a piezoelectric resonating element at a predetermined location of claim 5 further comprising a step of removing predetermined portions of said first and second thin film conductors to create a plurality of discrete thin film conductors arranged upon a surface of said resonating element in a predetermined arrangement.

7. In a gyroscope comprising an axi-symmetrical resonating element having a plurality of applied film conductors applied to a surface of an upper portion of said resonating element, said upper portion being supported upon a base portion, said base portion being substantially vibration free, an improvement comprising a plurality of applied film conductor leads, each of said plurality of conductor leads extending from one of said plurality of applied film conductors arranged upon said surface of said resonating element to said base portion of said element, each of said conductor leads being arranged to electrically connect said plurality of applied film conductors to circuitry for operating said gyroscope.

8. In an angular rate sensor comprising a tuning fork structure composed of vibrator components which include a pair of parallel piezoelectric drive elements and a pair of parallel piezoelectric sensing elements joined together into a tuning fork configuration where said drive and sensing elements lie lying in respectively orthogonal planes, a plurality of leads electrically connected to said drive and sensing elements; and a plurality of lead terminals electrically connected to said leads for communicating said sensed voltage signals to circuitry which operates said gyroscope, an improvement comprising a voltage pick-off conductor on a surface of each sensing element, said pick-off conductors being arranged and constructed to sense stress-induced voltage signals outputted by said sensing elements, said sensed voltage signals being indicative of a rate of rotation of said angular rate sensor, said pick-off conductors being applied to areas of the surface of said sensing elements that are subject to substantially zero stress when said angular rate sensor is rotationally stationary, each voltage pick-off conductors being interposed between one of the sensing elements and at least one of the leads to provide an electrical pathway from said sensing element to said lead.

9. In the improved angular rate sensing gyroscope of claim 8, an additional improvement comprising a voltage balancing conductor applied to said sensing elements and in conductive communication with said pick-off conductors, said voltage balancing conductor being arranged and constructed to zero net voltage signals sensed by said pick-off conductors when said angular rate sensor is rotationally stationary.

10. In an angular rate sensing gyroscope comprising a resonating element having a polygonal cross-section defining a plurality of faces, the resonating element being supported above a base upon a plurality of support members secured respectively to said base, a plurality of conductive pads formed on the base, a plurality of conductive elements secured to a predetermined number of the plurality of faces of the resonating element and having a plurality of wires which connect the conductive elements to the conductive pads, an improvement comprising arranging said conductive elements so as to sense net voltage signals proportional to a rate of rotation of said element when said element is rotated, by applying said conductive elements to said predetermined number of faces of said resonating element on an area of said faces subjected to substantially symmetric stress when said angular rate sensing gyroscope is rotationally stationary.

11. In the improved angular rate sensing gyroscope of claim 10, an additional improvement comprising a voltage balancing conductor applied to a predetermined number of said faces of said resonating element and in conductive communication with said conductive elements, said balancing conductor being arranged and constructed to zero net voltage signals sensed by said conductive elements when said angular rate sensing gyroscope is rotationally stationary.

12. An oscillating gyroscope having a single sensitive axis comprising:
    an axi-symmetric resonating element arranged and constructed to output voltage signals proportional to a level of stress induced therein, the resonating element being characterized by a stable oscillatory mode defining a plurality of nodes and anti-nodes;

a ground conductor applied to a first side of the resonating element;

an actuator conductor applied to a second side of the resonating element symmetrically about one of the anti-nodes of the resonating element, the ground and actuator conductors being constructed and arranged such that a voltage differential may be created therebetween for the purpose of driving the stable oscillatory mode of the resonating element; and a pick-off conductor applied to the second side of the resonating element symmetrically about one of the nodes of the resonating element, the pickoff conductor sensing signals from the resonating element due to rotation of the gyroscope about the sensitive axis.

13. The oscillatory gyroscope having a single sensitive axis of claim 12, wherein the stable oscillatory mode of the resonating element is defines two distinct nodal diameters.

14. The oscillating gyroscope having a single sensitive axis of claim 13, wherein the nodes and anti-nodes of the stable oscillatory mode of the resonating element are spaced 45° apart.

15. The oscillating gyroscope having a single sensitive axis of claim 14, wherein the actuator conductor has an upper boundary and a lower boundary that are substantially congruent to stress gradient contour lines that identify respective predetermined levels of stress present in the resonating element.

16. The oscillating gyroscope having a single sensitive axis of claim 15, in which the upper boundary of the actuator conductor is congruent to a stress gradient contour line that identifies a magnitude of stress that is at most 87 percent of the maximum stress present in the resonating element along the anti-node over which the actuator conductor is arranged, the lower boundary of the actuator conductor being substantially congruent to a stress gradient contour line that identifies a magnitude of stress that is at least 75 percent of the maximum stress present in the resonating element along the anti-node about which the actuator conductor is arranged.

17. The oscillating gyroscope having a single sensitive axis of claim 12, wherein the actuator conductor symmetrically spans no more than 50° about the anti-node of the resonating element.

18. The oscillating gyroscope having a single sensitive axis of claim 12 wherein the pick-off conductor senses a voltage signal that is substantially zero when the gyroscope is rotationally stationary.

19. The oscillating gyroscope having a single sensitive axis of claim 12 wherein the actuator conductor induces deflections in the resonating element substantially toward an anti-node defined by the stable oscillatory mode of the resonating element.

20. The oscillating gyroscope having a single sensitive axis of claim 12 wherein the actuator conductor measures approximately 20% of the diameter of the resonating element between an upper boundary and a lower boundary.

21. The oscillating gyroscope having a single sensitive axis of claim 12 wherein the actuator conductor laterally spans approximately 40% of the diameter of the resonating element.

22. The oscillating gyroscope having a single sensitive axis of claim 12 wherein the actuator conductor is an applied film conductor.

23. The oscillating gyroscope having a single sensitive axis of claim 12 wherein each of said actuator and pick-off conductors further includes a thin film conduction path formed on the surface of the resonating element that electrically connects respective actuator and pick-off conductors with a drive and sensing means at a location subject to substantially no vibration.

24. The oscillating gyroscope having a single sensitive axis of claim 23 wherein the width of the conduction path is between approximately 1% and 4% of the diameter of the resonating element.

25. The oscillating gyroscope having a single sensitive axis of claim 12 wherein the width of the pick-off is between 4% and 8% of the diameter of the resonating element.

26. The oscillating gyroscope having a single sensitive axis of claim 12 wherein the pick-off conductor has a balancing conductor electrically connected thereto.

27. The oscillating gyroscope having a single sensitive axis of claim 12 wherein at least one actuator is symmetrically divided into two halves that are symmetrically arranged about the anti-node.

28. An oscillating gyroscope having a single sensitive axis comprising:

an axi-symmetric resonating element characterized by a stable oscillatory mode defining a plurality of nodes and anti-nodes, the axi-symmetric resonating element being suspended within a magnetic field;

an actuator conductor applied to the resonating element symmetrically about an anti-node thereof, such that an electrical current passed through the actuator conductor will cause a deflection of the resonating element, the deflections inducing the stable oscillatory mode of the resonating element; and a pickoff conductor applied to the resonating element symmetrically about a node thereof such that movement of the pickoff conductor relative to the magnetic field induces an electrical current therethrough; the electrical current being indicative of rotation of the gyroscope about the sensitive axis.

29. The oscillating gyroscope of claim 28 wherein the nodes and anti-nodes of the axi-symmetric resonating element are spaced 45° apart from one another.

30. The oscillating gyroscope of claim 29 wherein the actuator conductors symmetrically span no more than 25° to either side of the anti-node.

31. The oscillating gyroscope of claim 28 wherein the pick-off conductors conduct substantially no current when the oscillating gyroscope is rotationally stationary.

32. The oscillating gyroscope of claim 28 wherein the stable oscillatory mode of the resonating element is defined by two nodal diameters.

33. The oscillating gyroscope of claim 32 wherein the deflections induced by the current passing through the actuator conductor are directed toward an anti-node defined by the stable oscillatory mode of the resonating element.

34. The oscillating gyroscope of claim 28 further comprising a plurality of flexible legs, the flexible legs being coupled to the resonating element so as to support the resonating element in the magnetic field.

35. The oscillating gyroscope of claim 34 wherein the flexible legs are coupled to the resonating element adjacent the nodes defined by the stable oscillatory mode of the resonating elements.

* * * * *

UNITED STATES PATENT AND TRADEMARK OFFICE
CERTIFICATE OF CORRECTION

PATENT NO. : 6,845,667 B1
DATED : January 25, 2005
INVENTOR(S) : William S. Watson It is certified that error appears in the above-identified patent and that said Letters Patent is hereby corrected as shown below:

Column 22,
Line 11, delete "lying".
Lines 24 and 25, delete "conductors" and insert -- conductor --.

Signed and Sealed this

Seventeenth Day of May, 2005

JON W. DUDAS
*Director of the United States Patent and Trademark Office*